(12) United States Patent
Handelsman et al.

(10) Patent No.: US 11,086,279 B2
(45) Date of Patent: Aug. 10, 2021

(54) METHOD TO PREPARE A POWER CONVERTER OR OTHER APPARATUS FOR CONFIGURATION

(71) Applicant: Solaredge Technologies Ltd., Herzeliya (IL)

(72) Inventors: Lior Handelsman, Givatayim (IL); Yaron Binder, Shoham (IL); Yoav Galin, Ra'anana (IL); Amir Fishelov, Tel Aviv (IL); Guy Sella, Bitan Aharon (IL)

(73) Assignee: Solaredge Technologies Ltd., Herzeliya (IL)

( * ) Notice: Subject to any disclaimer, the term of this patent is extended or adjusted under 35 U.S.C. 154(b) by 249 days.

(21) Appl. No.: 16/040,802

(22) Filed: Jul. 20, 2018

(65) Prior Publication Data

US 2019/0033804 A1 Jan. 31, 2019

Related U.S. Application Data

(60) Provisional application No. 62/539,228, filed on Jul. 31, 2017.

(51) Int. Cl.
*G06F 1/24* (2006.01)
*G06F 9/00* (2006.01)
(Continued)

(52) U.S. Cl.
CPC ............ *G05B 15/02* (2013.01); *B65B 61/182* (2013.01); *B65B 61/26* (2013.01); *G06Q 10/087* (2013.01);
(Continued)

(58) Field of Classification Search
CPC ....... G05B 15/02; B65B 61/26; B65B 61/182; G06Q 10/087; G06F 8/654; H02M 7/537;
(Continued)

(56) References Cited

U.S. PATENT DOCUMENTS 5,946,210 A * 8/1999 Montminy ............... H02M 3/00
700/97
6,256,732 B1 7/2001 Cromer et al.
(Continued)

FOREIGN PATENT DOCUMENTS

EP 2925097 A2 9/2015
JP 2011253268 A 12/2011

OTHER PUBLICATIONS

Sep. 13, 2008—EP Search Report—EP App No. 18186305.

*Primary Examiner* — Xuxing Chen
(74) *Attorney, Agent, or Firm* — Banner & Witcoff, Ltd.

(57) ABSTRACT

An order may be received for an apparatus such as a power converter or other power device, where the apparatus may be housed in a packing box. A configuration device may be programmed with information responsive to details of the order and an ID associated with the apparatus. A label or other identifying object may be created or configured (e.g., printed) and attached to the apparatus or may otherwise accompany the apparatus prior to dispatch of the packing box. The label may provide details of operating parameters of the apparatus responsive to the details of the order. Upon receipt and unpacking of the packing box, the configuration device may be connected to the apparatus, thereby to causing the apparatus to become configured.

21 Claims, 16 Drawing Sheets

(51) Int. Cl.
　　　*G05B 15/02*　　　(2006.01)
　　　*G06Q 10/08*　　　(2012.01)
　　　*B65B 61/26*　　　(2006.01)
　　　*B65B 61/18*　　　(2006.01)
　　　*H02M 7/537*　　　(2006.01)
　　　*H02M 3/335*　　　(2006.01)
　　　*H02M 3/337*　　　(2006.01)
　　　*G06F 8/654*　　　(2018.01)

(52) U.S. Cl.
　　　CPC ........... *G06F 8/654* (2018.02); *H02M 3/3372* (2013.01); *H02M 3/33507* (2013.01); *H02M 3/33584* (2013.01); *H02M 7/537* (2013.01)

(58) Field of Classification Search
　　　CPC ........... H02M 3/33507; H02M 3/3372; H02M 3/33584; H02M 3/158; G09F 3/0297; H02J 3/381
　　　See application file for complete search history.

(56) References Cited

U.S. PATENT DOCUMENTS

| | | | |
|---|---|---|---|
| 2011/0102148 | A1 | 5/2011 | Laffey et al. |
| 2013/0086373 | A1 | 4/2013 | Rothkopf et al. |
| 2015/0256355 | A1* | 9/2015 | Pera .................... H04L 12/2823 700/90 |
| 2018/0248505 | A1* | 8/2018 | Itoigawa ............... G06F 21/445 |

* cited by examiner

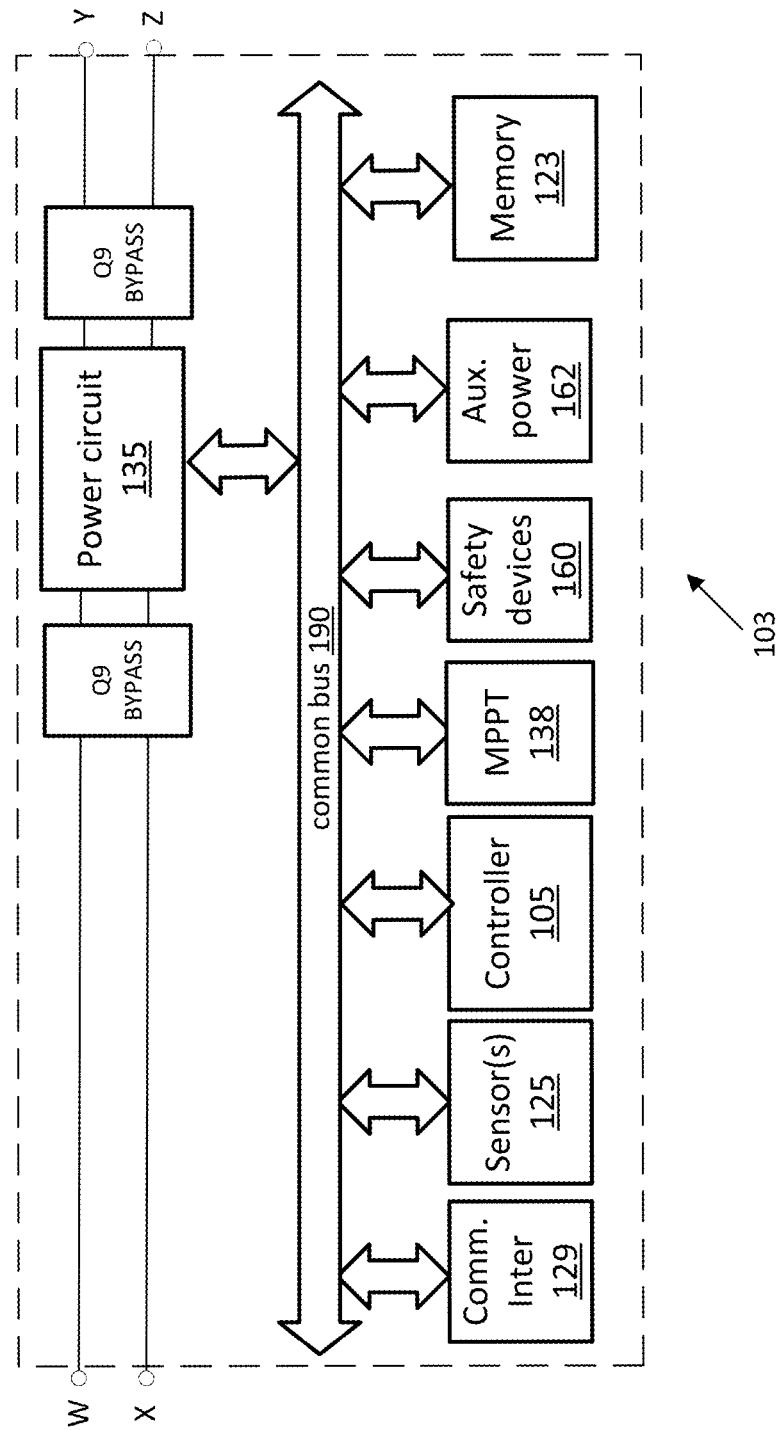

METHOD TO PREPARE A POWER CONVERTER OR OTHER APPARATUS FOR CONFIGURATION

CROSS-REFERENCE TO RELATED APPLICATIONS

The present application claims priority to U.S. Provisional Patent Application Ser. No. 62/539,228, filed Jul. 31, 2017, hereby incorporated by reference as to its entirety.

BACKGROUND

White label production may often be used for mass-produced generic products, which may include, for example, electronics, consumer products, and software packages such as DVD players, televisions, and web applications. Some companies may maintain a sub-brand for their goods, for example the same model of DVD player may be sold by the same company or different companies named and labeled as their "brandX," "brandY" and "brandZ," which may be branded and exclusively used by those companies. White label production may help to create branding to offer a product or service quickly and efficiently without investing in holding too much stock, or investing in infrastructure or technology creation around a solution which the product may provide. A possible limitation of the solution, however, may be the inability to provide a wider range of updateable product features for the product and a latest configuration for the product at the point of order and dispatch of the product to an end user. In some cases, the product must be powered-on to receive updates, which may limit ability to provide updateable product features at a time close to dispatch. This same problem may exist for other types of products as well, and is not necessarily limited to such mass-produced generic products.

SUMMARY

The following summary is a short summary of some of the inventive concepts for illustrative purposes only, is not intended to limit or constrain the inventions and examples in the detailed description, and is not intended to identify key or essential features. One skilled in the art will recognize other novel combinations and features from the detailed description.

Illustrative embodiments disclosed herein may be with respect to one or more apparatuses packed in a packing box which provides a resealable access to at least one apparatus packed inside the packing box. The term "box," as used herein, generically and colloquially refers to any container partially or fully housing the at least one apparatus, and is not intended to limit the shape or size of the container. For example, a packing "box," as the term is used herein, may be box-shaped, cylindrical, pyramidal, or of any other geometric or non-geometric shape. After receiving (for instance, in response to) a request (such as an order from a customer) for the apparatus(es), a configuration device may be provided on the inside or the outside of the packing box, via the resealable access, as part of the preparation and dispatch of the apparatus to a destination such as an end user. A configuration of the configuration device may be programmed prior to the dispatch of the apparatus to the destination. The configuration may be based on one or more operating parameters corresponding to the request and/or corresponding to the apparatus. More specifically, the request may be based on, for example, a specification (for instance, design) of a power system. Configuration of the apparatus may be enabled by virtue of a user, such as the end user, connecting the configuration device to the apparatus and applying operating power to the apparatus. Connecting the configuration device to the apparatus and applying operating power to the apparatus may configure the apparatus without a user necessarily having to initiate a dedicated configuration procedure of the apparatus.

The power system may include one or more controllers, one or more power sources (e.g., AC or DC power sources), one or more power devices (which may be, e.g., AC or DC power devices, and/or uni-directional or bi-directional power devices), and/or one or more power storage devices (e.g., batteries or capacitors). Each of the power sources may be coupled to a respective power device. The power devices' outputs may be coupled together in a connection, which may be for instance a series connection of the power devices outputs, to form thereby, a serial string of power device outputs. The connection may alternatively be a parallel connection of the power devices outputs to form thereby a parallel connection of power device outputs. The serial string or the parallel connection may be coupled to a load and may also be coupled to the power devices. Each of the power devices may be coupled to respective power storage devices. Power of each of the power sources may be measured by sensors of each of the power devices. The load may be a DC to AC inverter with an output connected to a utility grid. The DC to AC inverter may be configurable to convert power from the grid (AC) to DC to supply the storage devices or configurable to convert power from the power sources and/or storage devices to the load.

According to some aspects as described herein, methods, apparatus, and systems are described that may involve configuring a configuration device, labeling a packing box for an apparatus, and/or configuring the apparatus using the configuration device. For example, responsive to request received for an apparatus (e.g., an order from a customer), wherein the apparatus is housed in the packing box, a resealable access of the packing box may be opened (such as by a user or by machine), thereby revealing an identity (ID, e.g., ID number) of the apparatus. The ID of the apparatus may be entered into a computing device. The computing device may be programmed with a configuration device, with information responsive to a specification corresponding to the request, and/or with information indicating the ID of the apparatus. The ID, such as in an encrypted form, may be stored permanently or semi-permanently in a memory of the apparatus. A physical label may be printed and attached to the apparatus and/or the packing box containing the apparatus, and the label may indicate one or more operating parameters of the apparatus. The one or more operating parameters may be determined based on the specification corresponding to the request. The configuration device may be placed in the packing box, the resealable access of the packing box may then be closed, and the resealed packing box may be dispatched to its intended destination. Documentation, corresponding to the apparatus, may also be placed in the packing box. The specification corresponding to the request may comprise a specification for an interconnected power system comprising the apparatus. The apparatus may be any type of apparatus. For example, the apparatus may be a power device such as a power converter (e.g., a direct current (DC) to DC converter, a DC to alternating current (AC) inverter, and/or an AC to DC converter). In other examples, the apparatus may be any other type of electrical device, including any electromechanical device.

At the destination, after receiving the packing box, a user may unpack the packing box and communicatively couple the configuration device with the apparatus, such as by inserting the configuration device into a connection of the apparatus. Once connected, the configuration device may be used to configure the apparatus. Such configuration may be performed automatically by the apparatus and/or by the configuration device in response to the inserting of the configuration device, without the user necessarily having to perform further action for such configuration (although requiring or allowing further user action is not prohibited if so desired). In a further example, the configuring may be performed in response to operating power being applied to the apparatus. The configuration may be authenticated so that the apparatus operates according to the operating parameters (that may be specified on the label).

According to further aspects as described herein, a non-transitory computer readable medium (such as one or more memories, DVDs, or hard drives) may have computer-executable instructions recorded thereon which, when executed by one or more processors, cause a computing device or system having the one or more processors to perform certain steps. Those steps may comprise, for example, causing a first user interface to be displayed for allowing a user to enter the ID) of the apparatus for receipt by the computing device or system; causing a second user interface to be displayed for configuring a configuration device with information corresponding to details of the aforementioned request for the apparatus; and causing printing of the aforementioned label for the apparatus. As mentioned above, the label may indicate the one or more operating parameters of the apparatus.

According to still further aspects, a method is provided that comprises receiving the request for the apparatus, configuring the configuration device with an identifier associated with the apparatus and with a specification corresponding to the request, providing a label indicating the identifier, and sending the apparatus and the label (for example, together in the packing box) to a destination associated with the request.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 1D illustrates circuitry which may be found in a power device, according to illustrative aspects of the disclosure.

DETAILED DESCRIPTION

Figure 1A:
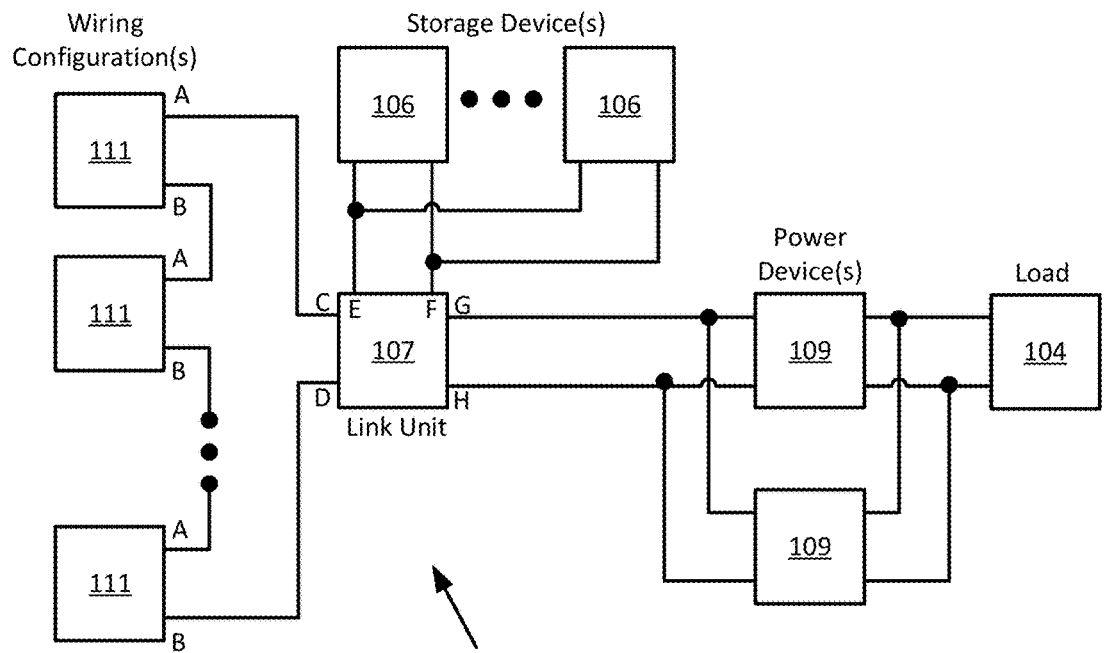
FIG. 1A illustrates a block diagram of a power system, according to illustrative aspects of the disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

By way of introduction, features as described herein may be directed to a method to provide a configuration device with an order or other request for an apparatus. References to an "order" are merely illustrative, and it will be understood that any type of request for the apparatus may be initiated, which may be initiated by a customer or by any other party or device via any means of communication. The apparatus may be any electronic device, including an electromechanical device. The apparatus may already be housed in a packing box. The packing box may be utilized for a dispatch of the apparatus to an end user. The packing box may comprise a flap mechanism, a window, a document, a document wallet, and/or a label attached to an interior or exterior surface of the packing box or to the apparatus itself. Opening of the flap or looking through the window may reveal identifying information (e.g., a barcode, plain text, a serial number, an image, distinguishing physical features such as color or shape of the apparatus or part of the apparatus, etc.) of the apparatus to an operator involved in processing the order or other type of request. According to some aspects, the identifying information may be partially or fully programmed in data storage device associated with the apparatus, such as stored in an electronic tag included in or with the configuration device (e.g., contained by an RFID tag) and obtained by reading the electronic tag or other data storage device. If a label is used, the identifying information (e.g., serial number) may be read from the label, directly by a human user or via a label reading device such as a bar code scanner. The method may provide a way of programming the configuration device responsive to details of the order item and the serial number of the apparatus, thereby providing a configuration for the apparatus responsive to the details of the order. The configuration device may be electronic (e.g., an SD-card or a USB stick) and may be communicatively connectible with the apparatus (e.g., insertable into the apparatus), or the configuration device may be a device for displaying information (e.g. a piece of paper or a sticker) with the information manually inputtable to the apparatus (e.g., by entering a code using a keypad or other input interface of the apparatus). Upon receipt of the order for the apparatus, a user (such as an end user) may be able to retrieve the configuration device attached to the packing box for example, partially or fully unpack the packing box, and connect the configuration device to the apparatus, or inputting into the configuration device a serial code or password displayed on or otherwise indicated by the configuration device (where, for example, the configuration device may be or include a sticker, a manual, or a piece of paper containing information such as an identifying number, code and/or password). Where the configuration device is an electronic device, connecting the configuration device to the apparatus may authenticate the configuring by the configuration device of the apparatus. The authentication may be such that the ID (e.g., serial number) of the apparatus corresponds (e.g., exclusively) with the configuration device to allow continued normal operation of the apparatus. The configuring additionally may ensure that the apparatus operates according to the operating parameters for the apparatus specified by the order. In further examples, the apparatus may be configured and/or authenticated without needing to remove the apparatus from the packing box.

Connecting the configuration device to the apparatus and subsequently applying operating power to the apparatus may configure the apparatus without a user necessarily having to initiate a special configuration process of the apparatus (although if such a special configuration process initiated by the user is desirable, it may be included).

Reference is now made to FIG. 1A, which illustrates a block diagram of a power system 10a, according to illustrative aspects of the disclosure. Power system 10a may include one or more wiring configurations 111. Each wiring configuration 111 may include one or more power sources which may be connected to a respective power device. Power sources may be AC power sources (e.g., wind turbines) or sources of DC power derived from wind turbines, battery banks, photovoltaic solar panels, rectified alternating current (AC) or petrol generators for example. Each wiring configuration 111 may include output terminals A and B. The outputs on terminals A and B of the wiring configurations 111 may be connected in series to form a series connection of wiring configuration 111 outputs, which may be connected to input terminals C and D of a link unit 107. Connected to terminals E and F of link unit 107 may be one or more storage devices 106. Storage devices 106 may be devices for storing power, such as one or more power cells, batteries, flywheels and/or super capacitors. A feature of terminals E and F of link unit 107 may be that link unit 107 may be configurable in order to allow storage devices 106 to be charged from wiring configurations 111 and/or one or more system power devices 109 and/or discharged into load 104 via system power devices 109. Two system power devices 109 are shown in the illustrated example with respective inputs and outputs connected in parallel. Two or more system power devices 109 may be connected together with respective inputs and outputs connected in parallel. The inputs of system power devices 109 may be connected to terminals G and H of link unit 107. The outputs of system power devices 109 may be connected to load 104 and/or multiple loads 104. System power devices 109, according to illustrative aspects of the disclosure, may be for example DC to AC inverters and load 104 may be an AC utility grid. As another example, system power devices 109 may be DC combiner boxes, and load 104 may be a DC to AC inverter connected to an AC utility grid.

Figure 1B:
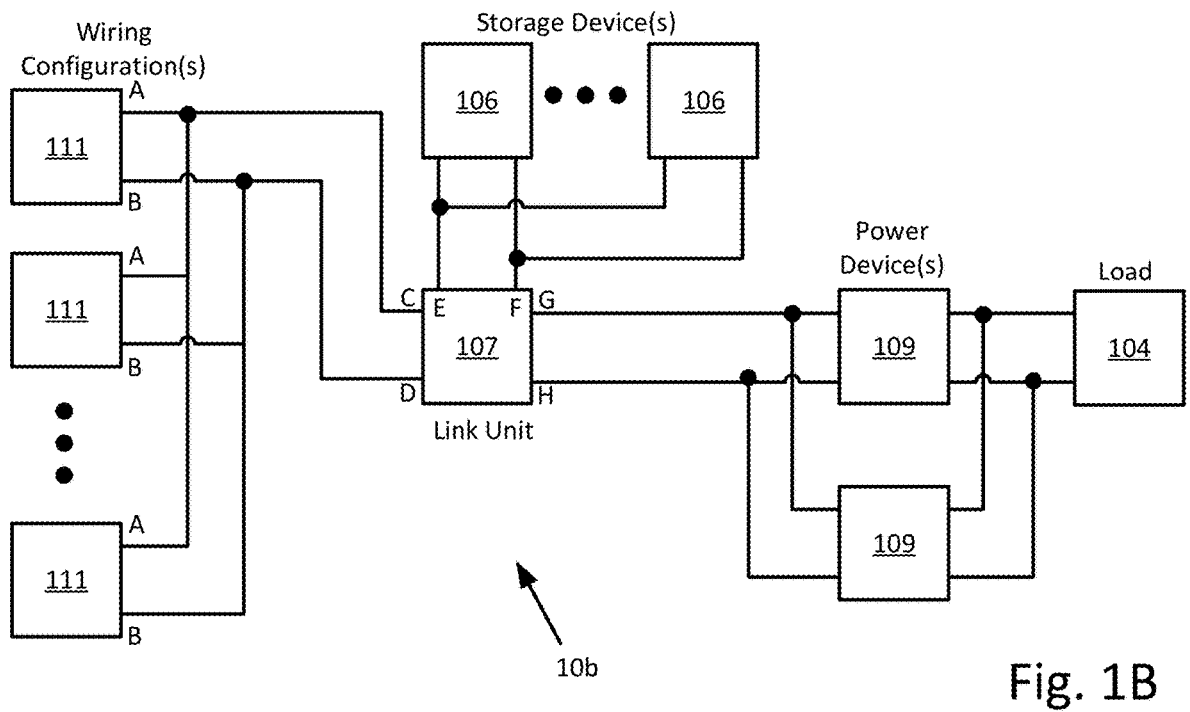
FIG. 1B illustrates a block diagram of a power system, according to illustrative aspects of the disclosure.

Reference is now made to FIG. 1B, which illustrates a block diagram of a power system 10b, according to illustrative aspects of the disclosure. Power system 10b may be similar to power system 10a except with respect to wiring configurations 111. In power system 10b each wiring configuration 111 may include output terminals A and B but the outputs on terminals A and B of the wiring configurations 111 may be connected in parallel to form a parallel connection of wiring configuration 111 outputs which may be connected to input terminals C and D of a link unit 107.

A feature of link units 107 according to certain aspects may be to include a power device such as power devices 103, which may convert power bi-directionally. A first direction of power conversion by a power device may be when multiple storage devices 106 are sourced with converted power from the power devices. Storage devices 106 may receive converted power from the power devices when storage devices 106 are being charged for example. A second direction of power conversion may be when power from storage devices 106 is converted by the power device to be supplied to loads 104 via system power devices 109.

With respect to system power devices 109, which may be DC to AC inverters, a first direction of power conversion by the inverters may be from AC to DC. The first direction may be for when multiple storage devices 106 are sourced with converted power from load 104 which may be an AC utility grid, for example. A second direction of power conversion may be used when power from storage devices 106 is converted by inverters to be supplied to loads 104 via system power devices 109. The second direction of power conversion may also include power from power sources 101 with respective power device 103.

Figure 1C:
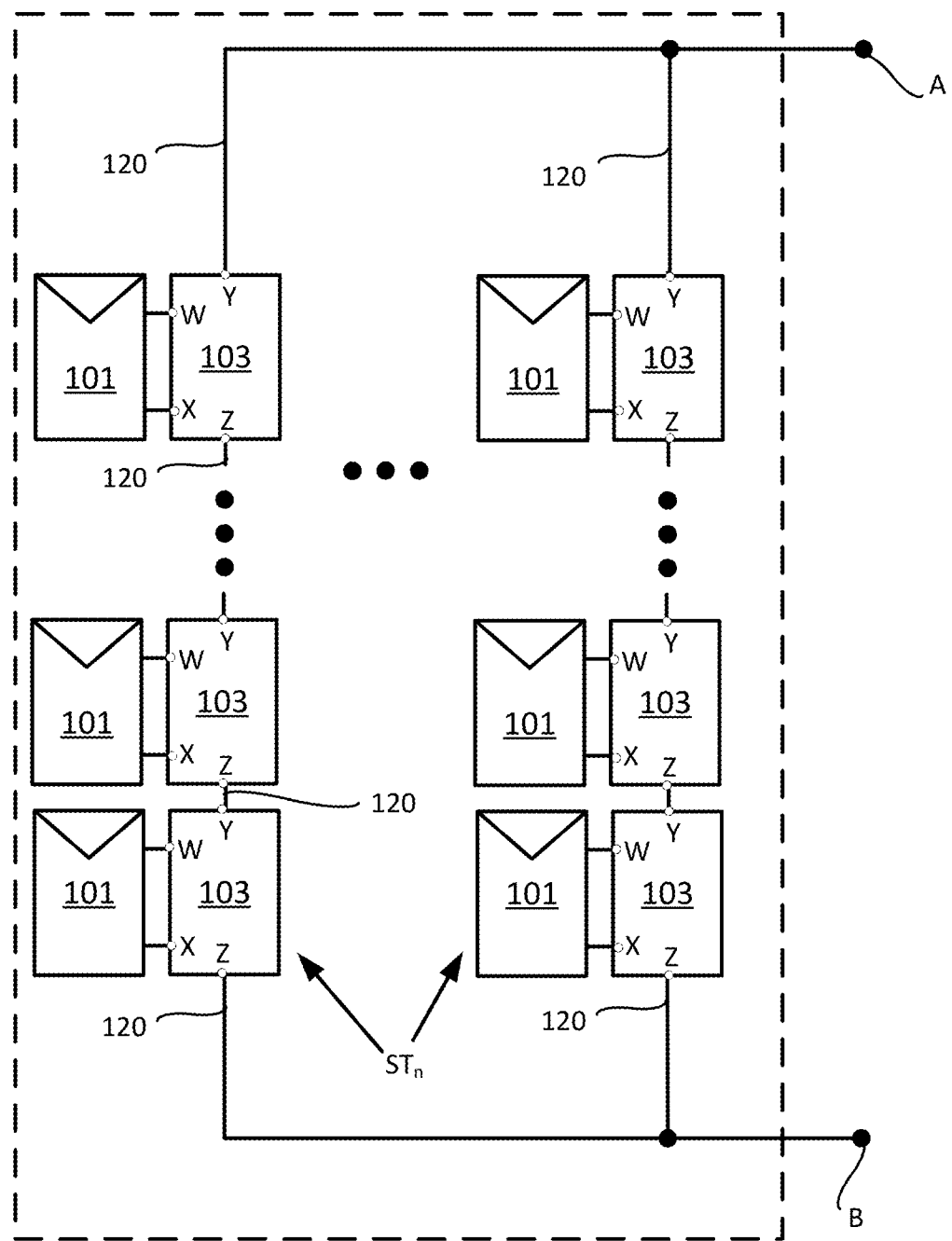
FIG. 1C illustrates details of wiring configurations shown in FIGS. 1A and 1B, according to illustrative aspects of the disclosure.

Reference is now made to FIG. 1C, which illustrates more details of example wiring configurations 111 shown in FIGS. 1A and 1B, according to illustrative aspects of the disclosure. In this example, multiple (n>1) strings $ST_n$ are shown in a wiring configuration 111, which are connected in parallel at terminals A and B. The output of wiring configuration 111 at terminals A and B may connect to the input of link unit device 107 at terminals C and D. Each wiring configuration 111 may include one or more power sources 101 that may be connected to a respective power device 103 at terminals W and X. The outputs of power devices 103 at terminals Y and Z may be connected together to form a string $ST_n$ which connects across terminals A and B. The connections in string $ST_n$ and strings $ST_n$ connected to terminals A and B are provided by power lines 120. Alternatively, strings $ST_n$ may connect in series rather than in parallel as shown (or in any other connection configuration), and the series connection of strings $ST_n$ may connect across terminals A and B. According to features described above both wiring configurations 111 and power sources 101/ power devices 103 contained in a wiring configuration 111 may be connected in various series/parallel or parallel series combinations. In general, power sources 101 may contain different types of power derived from both renewable energy sources such as from sunlight, wind or wave power and non-renewable energy sources such as fuel used to drive turbines or generators, for example.

Reference is now made to FIG. 1D, which illustrates an example of circuitry which may be found in a power device such as power device 103, according to illustrative aspects of the disclosure. Input and output terminals W, X, Y, and Z may provide connection to power lines 120 (not shown in FIG. 1D). In some embodiments, power device 103 may include power circuit 135. Power circuit 135 may include a converter such as a direct current-direct current (DC/DC) converter such as a Buck, Boost, Buck/Boost, Buck+Boost, Cuk, Flyback and/or forward converter, or a charge pump. In some embodiments, power circuit 135 may include a direct current-alternating current (DC/AC) converter (also known as an inverter), such as a micro-inverter. Power circuit 135 may have two input terminals and two output terminals (or any other number of terminals as desired), which may be the same as (or connected to) the input terminals and output terminals of power device 103. In some embodiments, power device 103 may include Maximum Power Point Tracking (MPPT) circuit 138, configured to extract increased power from a power source.

In some embodiments, power circuit 135 may include MPPT functionality. In some embodiments, MPPT circuit 138 may implement impedance matching algorithms to extract increased power from a power source. Power device 103 may further include a controller 105, such as one or more microprocessors, Digital Signal Processors (DSPs), Application-Specific Integrated Circuits (ASICs) and/or Field Programmable Gate Arrays (FPGAs).

Still referring to FIG. 1D, controller 105 may control and/or communicate with other elements of power device 103 via one or more communication paths, such as via common bus 190. In some embodiments, power device 103 may include circuitry and/or sensors/sensor interfaces 125 configured to measure parameters directly or receive measured parameters from connected sensors and/or sensor interfaces 125 configured to measure parameters on or near power source 101, such as the voltage and/or current output by power source 101 and/or the power output by power source 101. In some embodiments, power source 101 may be or otherwise include one or more photovoltaic (PV) generators comprising one or more PV cells, and a sensor or sensor interface may directly measure or receive measurements of the irradiance received by the PV cells, and/or the temperature on or near the PV generator.

Still referring to FIG. 1D, in some embodiments, power device 103 may include communication interface 129, configured to transmit and/or receive data and/or commands from other devices. Communication interface 129 may communicate using any desired technology or standard, such as Power Line Communication (PLC) technology, acoustic communications technology, or additional technologies such as ZIGBEE™, Wi-Fi, BLUETOOTH™, near field communication (NFC), cellular communication or other wireless methods. Power Line Communication (PLC) may be performed over power lines 120 between power devices 103 and link unit (e.g. DC-DC converter and/or inverter) 107 which may include a similar communication interface to communication interface 129.

In some embodiments, power device 103 may include memory 123, (which may physically comprise one or more memories) for logging measurements taken by sensor(s)/sensor interfaces 125, and/or for storing code, operational protocols, and/or other operating information. Memory 123 may be flash, Electrically Erasable Programmable Read-Only Memory (EEPROM), Random Access Memory (RAM), Solid State Devices (SSD), and/or other types of appropriate memory devices.

Still referring to FIG. 1D, in some embodiments, power device 103 may include one or more safety devices 160 (e.g. fuses, circuit breakers, and/or Residual Current Devices (RCDs)). Safety devices 160 may be passive or active. For example, safety devices 160 may include one or more passive fuses disposed within power device 103 where the element of the fuse may be designed to melt and disintegrate when excess current above the rating of the fuse flows through it, to thereby disconnect part of power device 103 so as to avoid damage. In some embodiments, safety devices 160 may include one or more active disconnect switches, configured to receive commands from a controller (e.g. controller 105, or an external controller) to short-circuit and/or disconnect portions of power device 103, or configured to short-circuit and/or disconnect portions of power device 103 in response to a measurement measured by a sensor (e.g. a measurement measured or obtained by sensors/sensor interfaces 125). In some embodiments, power device 103 may include auxiliary power circuit 162, configured to receive power from a power source connected to power device 103, and output power suitable for operating other circuitry components (e.g. controller 105, communication interface 129, etc.). Communication, electrical connecting and/or data-sharing between the various components of power device 103 may be carried out over common bus 190. In some embodiments, auxiliary power circuit 162 may be connected to an output of a power device 103 and designed to receive power from power sources connected to other power devices.

Power device 103 may include or be operatively attached to a maximum power point tracking (MPPT) circuit. The MPPT circuit may also be operatively connected to controller 105 or another controller 105 included in power device 103 which may be designated as a primary controller. According to some aspects of the current disclosure, a primary controller in power device 103 may communicatively control one or more other power devices 103 which may include controllers known as secondary controllers. Once a primary/secondary relationship may be established, a direction of control may be from the primary controller to the secondary controllers. The MPPT circuit, under control of a primary and/or central controller 105, may be utilized to increase power extraction from power sources 101 and/or to control voltage and/or current supplied to link unit (e.g. DC-DC converter and/or an inverter or a load) 107. In some embodiments, no single power device 103 might be designated as a primary controller, and each power device 103 may operate independently without being controlled by a primary controller, or a primary controller may be separate from power devices 103.

Referring still to FIG. 1D, in some embodiments, power device 103 may include one or more bypass units Q9 coupled between the inputs of power circuit 135 and/or between the outputs of power circuit 135. Each bypass unit Q9 and/or power circuit 135 may be a junction box to terminate power lines 120 or to provide a safety feature such as fuses or residual current devices. Bypass units Q9 may each also be an isolation switch, for example. Bypass units Q9 may each be or otherwise include a passive device, for example, a diode, or an active device such as a transistor. Bypass units Q9 may each be controlled by controller 105. If an unsafe condition is detected, controller 105 may set bypass unit(s) Q9 to ON, thereby short-circuiting the input and/or output of power circuit 135. In one example, where the pair of power sources 101 may be photovoltaic (PV) generators, each PV generator may provide an open-circuit voltage at its output terminals. In this example, when bypass unit(s) Q9 is/are ON, the PV generators may be short-circuited, to provide a voltage of about zero to power circuit 135. In both scenarios, a safe voltage may be maintained, and the two scenarios may be staggered to alternate between open-circuiting and short-circuiting PV generators. This mode of operation may allow continuous power supply to system control devices, as well as provide backup mechanisms for maintaining a safe voltage (i.e., operation of bypass unit(s) Q9 may allow continued safe operating conditions).

In some embodiments, the power device 103 may comprise a partial group of the elements illustrated in FIG. 1D. For example, a power device 103 might not include power circuit 135 (i.e. power circuit 135 may be replaced by a short circuit, and a single bypass unit Q9 may be featured). In a scenario where power circuit 135 is not present, power device 103 may be still used to provide safety, monitoring and/or bypass features.

Figure 1E:
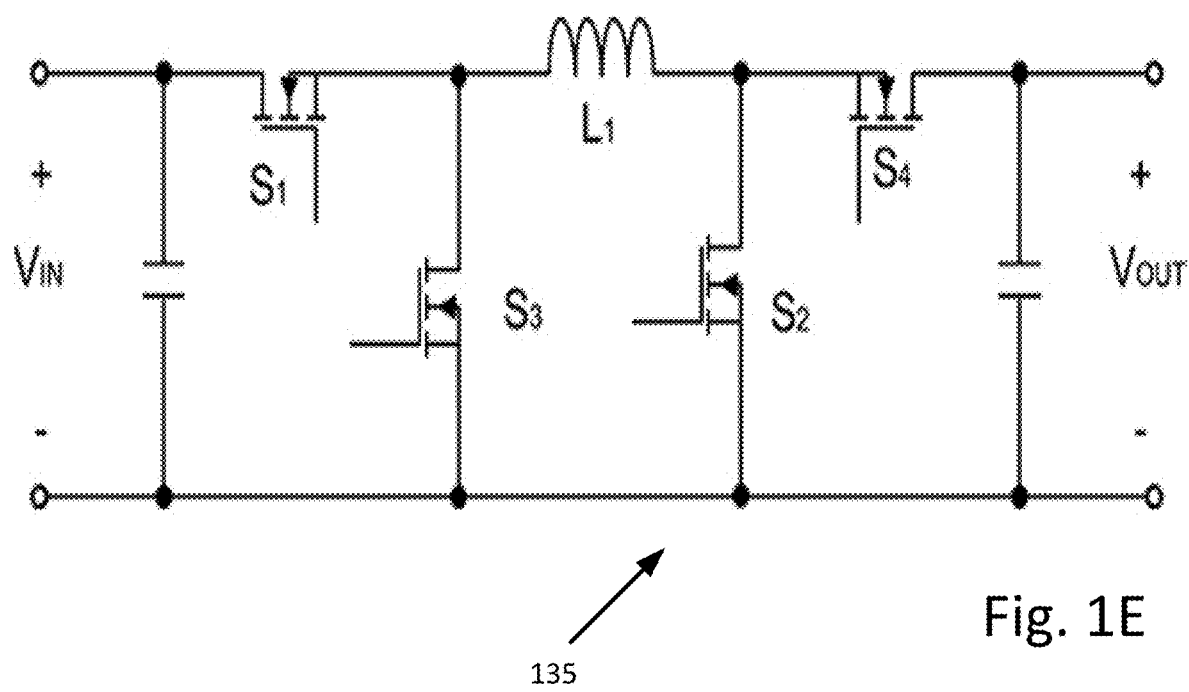
FIG. 1E shows a buck+boost circuit implementation for a power circuit, according to illustrative aspects of the disclosure.

Reference is now made to FIG. 1E, which shows a buck+boost circuit implementation for power circuit 135, according to one or more illustrative aspects of the disclosure. The buck+boost circuit implementation for power circuit 135 in this example utilizes metal oxide semiconductor field effect transistors (MOSFETs) for switches S1, S2, S3, and S4, although other types of transistors or other switches may be used. The sources of switches S1, S2, S3, and S4 are referred to as first terminals, the drains of S1, S2, S3, and S4 are referred to as second terminals and the gates of S1, S2, S3, and S4 are referred to as third terminals. Capacitor C1 may be connected in parallel across the respective positive (+) and negative (−) input terminals C and D of the buck+boost circuit where the voltage may be indicated as $V_{IN}$. Capacitor C2 may be connected in parallel across the respective positive (+) and negative (−) output terminals A and B of the buck+boost circuit where the voltage may be indicated as $V_{OUT}$. First terminals of switches S3 and S2 may connect to the common negative (−) output and input terminals of the buck+boost circuit. A second terminal of switch S1 may connect to the positive (+) input terminal and a first terminal of switch S1 may connect to a second terminal of switch S3. A second terminal of switch S4 may connect to the positive (+) output terminal and a first terminal of switch S4 may connect to the second terminals of switch S2. Inductor L1 may connect respectively between the second terminals of switches S3 and S4. Third terminals of switches S1, S2, S3, and S4 may be operatively connected to controller 105.

Switches S1, S2, S3, and S4 may be implemented using semi-conductor devices, for example, metal oxide semiconductor field effect transistors (MOSFETs), insulated gate bipolar transistors (IGBTs), bipolar junction transistors (BJTs), Darlington transistor, diode, silicon controlled rectifier (SCR), Diac, Triac, or other semi-conductor switches known in the art. Using by way of example, switches S1, S2, S3, and S4 may be implemented by use of bipolar junction transistors where the collectors, emitters and bases may refer to first terminals, second terminals and third terminals described and defined above. Switches S1, S2, S3, and S4 may be implemented using mechanical switch contacts, such as hand operated switches or electro-mechanically operated switches such as relays. Similarly, power device 103 may include, for example, a buck circuit, a boost circuit, a buck/boost circuit, a Flyback circuit, a Forward circuit, a charge pump, a Cuk converter, or any other circuit that may be utilized to convert power on the input of power device 103 to the output of power device 103.

Figure 1F:
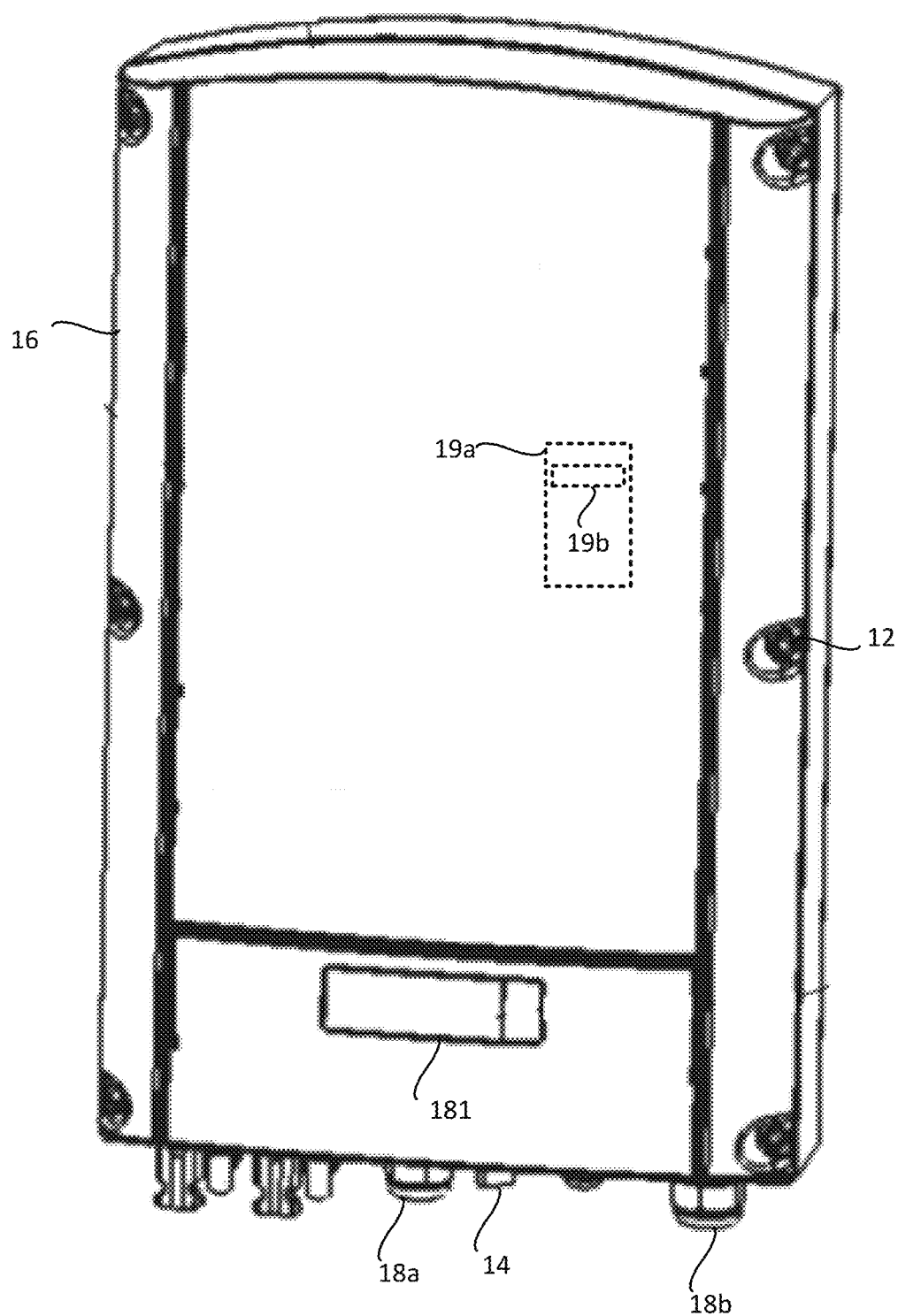
FIG. 1F shows an isometric drawing of a housing which houses a system power device, according to illustrative aspects of the disclosure.

Reference is now made to FIG. 1F, which shows an isometric drawing of an example housing 16 which houses system power device 109, according to one or more illustrative aspects of the disclosure. Housing 16 may include data connector 14, which may allow the connection of a cable between a communication interface of system power device 109 and mobile computing system. Cable glands 18a and 18b may be used for the insertion and securing of power lines 120 of FIG. 1C (not shown in FIG. 1F) for which the conductors of power lines 120 may then be terminated inside housing 16. Display 181 may be mounted on the front panel of housing 16. According to some illustrative aspects, display 181 may extend across a substantial portion of housing 16 (e.g., display 181 may extend across the entire front panel or most of the front panel of housing 16). In other examples, display 181 may take up a relatively smaller portion of the front panel. The front panel is shown attached to the rear portion of housing 16 with fasteners 12. Inside housing 16 is mounted a configuration device 19b, which may be operatively connected to the circuitry of system power device 109 and a corresponding configuration device reader 19a. Examples of configuration device 19b and corresponding configuration device reader 19a include a SECURE DIGITAL™ (SD) card and SD card reader, universal serial bus (USB™) stick and USB™ port, active or passive RFID tag and RFID tag reader, magnetic disc and disc reader, or optical disc and optical disc reader. Alternatively or additionally, a piece of paper or other material having a configuration code, etc., may be utilized with means to input the configuration code to the circuitry of system power device 109 instead of or in addition to configuration device 19b and corresponding configuration device reader 19a according to aspects described herein.

In the descriptions that follow, reference is made to system power devices 109, power devices 103, link units 107 and power circuits 135 which are only examples of apparatuses that may be ordered by a customer to be installed as part of an interconnected power system such as power system 10a/10b for example. As such, the term apparatus may be made in reference to system power devices 109, power devices 103, link units 107 and power circuits 135. In general, for the descriptions that follow, the apparatuses may be considered to be generic apparatuses or non-generic apparatuses that may be supplied to a customer in a packing box along with configuration device 19b. Configuration device 19b may be utilized as part of the installation of apparatuses in an interconnected power system, for example. Configuration device 19b may be located and connected inside housing 16 used to house system power device 109 as shown in FIG. 1F, for example, or operatively connected to the apparatus by data connector 14. Configuration device 19b may be a non-volatile memory such as a SECURE DIGITAL™ (SD) card for example. Other types of non-volatile memory may include read-only memory, flash memory, ferroelectric RAM, most types of magnetic computer storage devices (e.g. hard disk drives, floppy disks, and magnetic tape) and/or optical discs. The installer of the apparatus may operatively connect configuration device 19b to the apparatus in order to commission apparatus and to establish thereby a unique set of operating parameters for the apparatus as ordered. In some cases, the apparatus might not function properly or fully if not connected to (or until after connection to) configuration device 19b before or during commissioning and/or installation. Configuration device 19b may be inserted or coupled to the apparatus by a person involved in the installation and/or maintenance of an interconnected power system such as power system 10a/10b for example.

Figure 2:
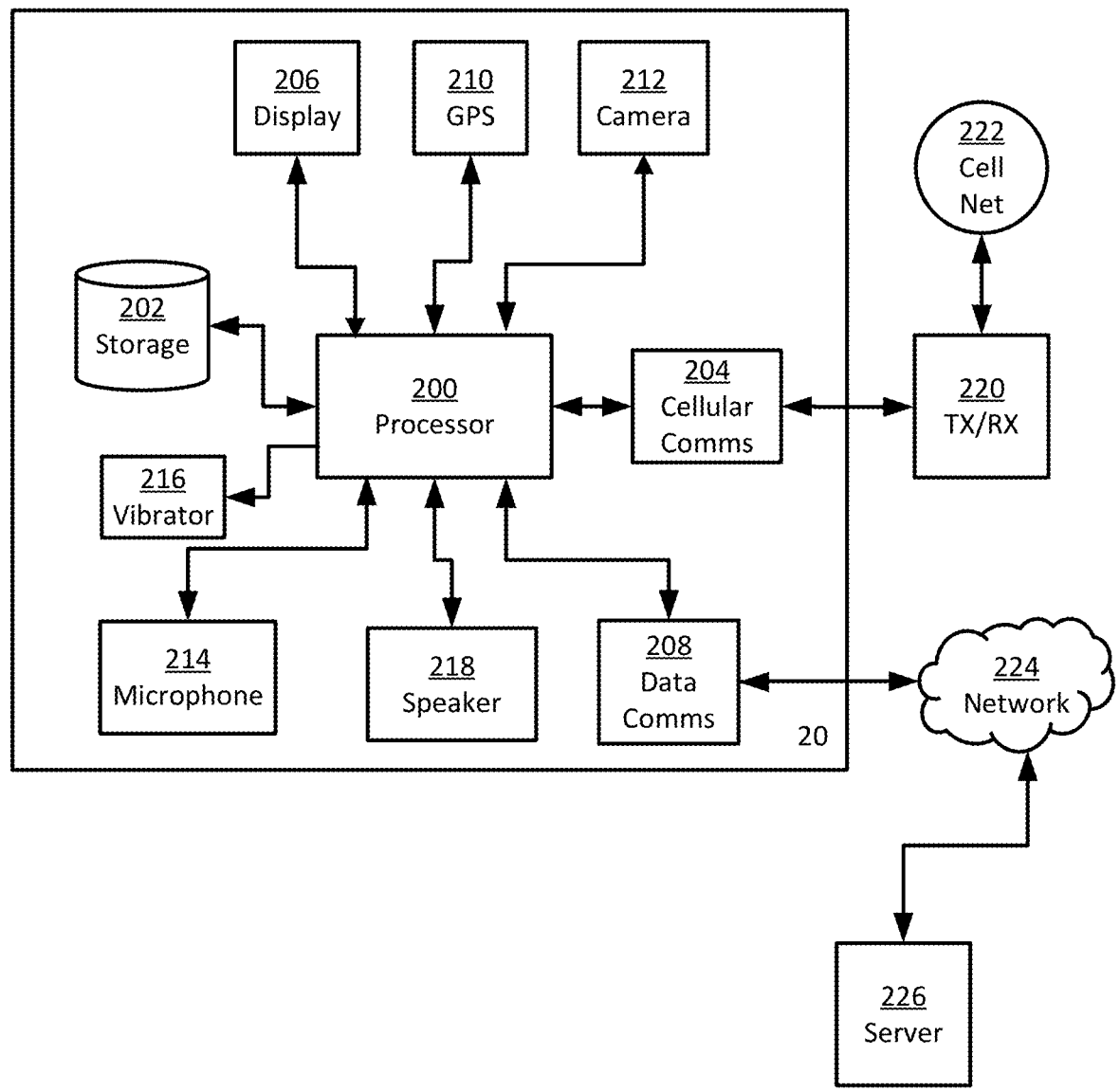
FIG. 2 illustrates a simplified block diagram of a computing device, according to illustrative aspects of the disclosure.

Reference is now made to FIG. 2, which illustrates a simplified block diagram of an example computing device 20 according to one or more illustrative aspects of the disclosure. Computing device 20 may be, for example, any computing device such as a mobile computing device, e.g., a mobile smart phone (e.g., an IPHONE™ of Apple Inc., a laptop computer or a smart-phone configured to run an ANDROID™ open operating system), laptop computer, handheld computer, server, desktop computer, etc. Computing device 20 may be connectible over a network 224 to a server 226. Computing device 20 may be also connectible via a communication network, such as via a cellular base station transceiver 220 to the remainder of cellular network 222. Computing device 20 may include one or more processors 200 connected to a computer-readable medium such as local and/or remote data storage 202, which may store data and/or computer-executable instructions that are executable by the one or more processors 200. A data communications module 208 may connect processor(s) 200 to communications network 224, which may be connected to the internet. Another communications module, such as a cellular communications module 204, may connect processor(s) 200 to another communications network such as a cellular network 222, and cellular network 222 may be further connected to the internet. Computing device 20 may include one or more devices connected to processor(s) 200, for example, one or more peripheral accessory devices such as a display 206, global positioning system (GPS) 210, camera 212 (or other optical sensor such as a bar code or QR code scanner), a microphone 214, a speaker 218, a vibrator 216, accelerometer/gravity sensor/gyroscopic sensor unit 228, BLUETOOTH™, and/or infra-red sensor. Display 206 may provide a user interface such as a graphical user interface (discussed later) to an operator for an application that runs on mobile computing system 20. An operator of computing device 20 may be, for example, a warehouse operator who uses an application running on computing device 20 to help dispatch an order. By way of example, the order may include apparatuses packaged in packing boxes and designated for shipping to an end user or an installer of a power system. The power system may include and utilize apparatuses which may include items such as direct current (DC) to DC converters, DC to alternating current (AC) inverters and AC to DC converters, safety devices and/or monitoring devices which are described in more detail in the descriptions which follow.

Figure 3:
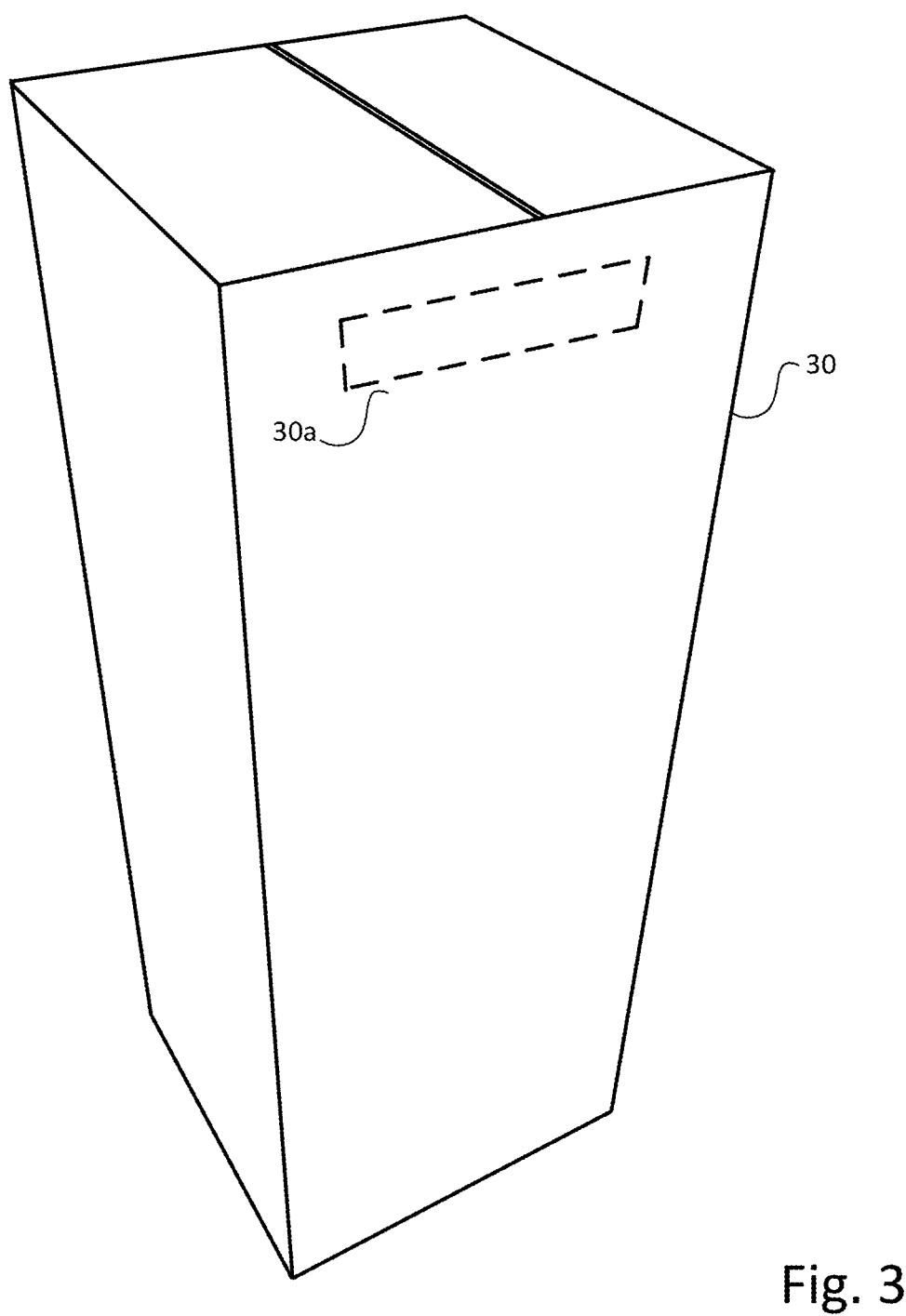
FIG. 3 illustrates an isometric drawing of a packing box, according to illustrative aspects of the disclosure.

Reference is now made to FIG. 3, which illustrates an example packing box 30, according to illustrative aspects of the disclosure. As stated previously, a packing box (such as packing box 30) may be of any shape and is not necessarily "box" shaped. In the illustrated example, packing box 30 includes a portion 30a shown by dotted line. Portion 30a may be located on any surface of packing box 30. Packing box 30 may be utilized to pack an apparatus (not shown) in order to store the apparatus and/or at some time later dispatch the apparatus responsive to an order for the apparatus. Packing box 30 may vary in size and shape, for example, in order to best accommodate an item packed in packing box 30. As stated previously, the apparatus may be any electronic device.

Figure 3A:
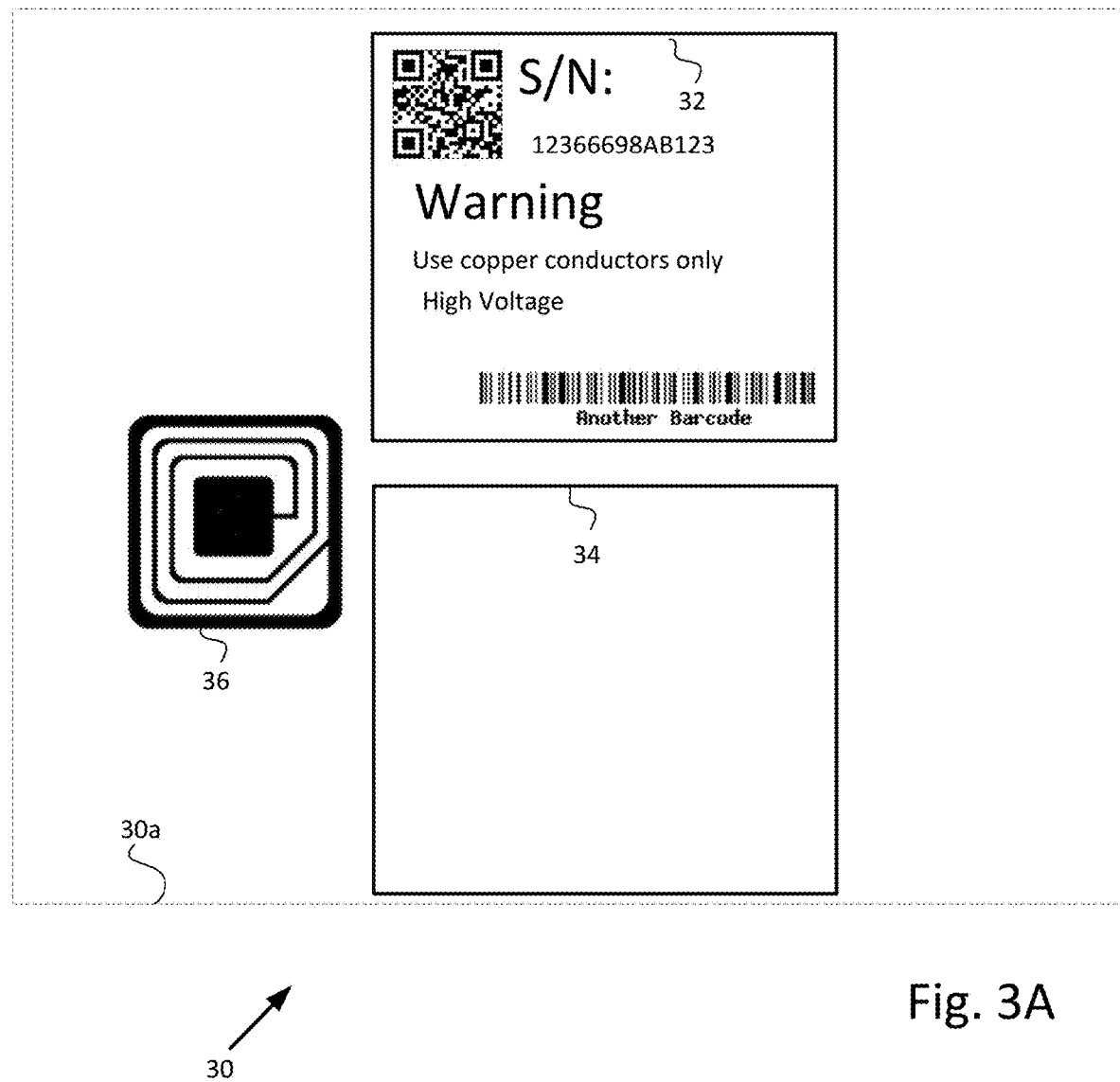
FIGS. 3A, 3B and 3C illustrate a portion of a packing box, according to illustrative aspects of the disclosure.

Reference is now made to FIG. 3A, which illustrates further features of portion 30a, according to illustrative aspects of the disclosure (such as portion 30A of packing box 30 discussed above with regard to FIG. 3). Portion 30a may be a surface of packing box 30 onto which may be attached a label or label/plate 32 that indicates an identifier associated with the apparatus (potentially uniquely associated with the apparatus), such as a serial number of the apparatus. Plate 32 and/or label area 34 may alternatively be placed in a see-through 'documents enclosed' wallet. The 'documents enclosed' wallet or the document wallet may be attached to the outer or inner surface, for example, of packing box 30, or otherwise enclosed within packing box 30. The identifier, such as a serial number (e.g., serial number 12366698AB123) on label/plate 32 may be a unique identifier assigned to the apparatus and may also be available to the operator as a computer-readable printed identifier such as a quick response (QR™) code or barcode. In general, for the descriptions which follow, identification details of an apparatus packed in a packing box 30 may utilize an RFID tag 36, a barcode, an alphanumeric serial number and/or alpha numeric description on the label/plate 32 or on a separate item such as a separate piece of paper to provide a readable record of the identification details. The readable record of the identification details may be read by a user and/or a computing device such as the mobile computer system 20, which may include a scanner and/or a camera such as camera 212.

Alternatively or in addition to the label, a radio frequency identification (RFID) tag 36 that may include the identifier assigned to the apparatus may also be attached to the surface of the apparatus and/or the packing box 30, and/or embedded in the material of the packing box 30, and/or located elsewhere within the packing box 30. Additional warning and/or safety information, model number, and brand name of the apparatus in the packing box 30 may also be included on serial number plate 32. A label area 34 may be utilized to attach a label to the surface and/or placed inside the document wallet which may be attached to the surface. The label may be printed with details responsive to the requirements of processing an order according to the descriptions which follow.

Figure 3B:
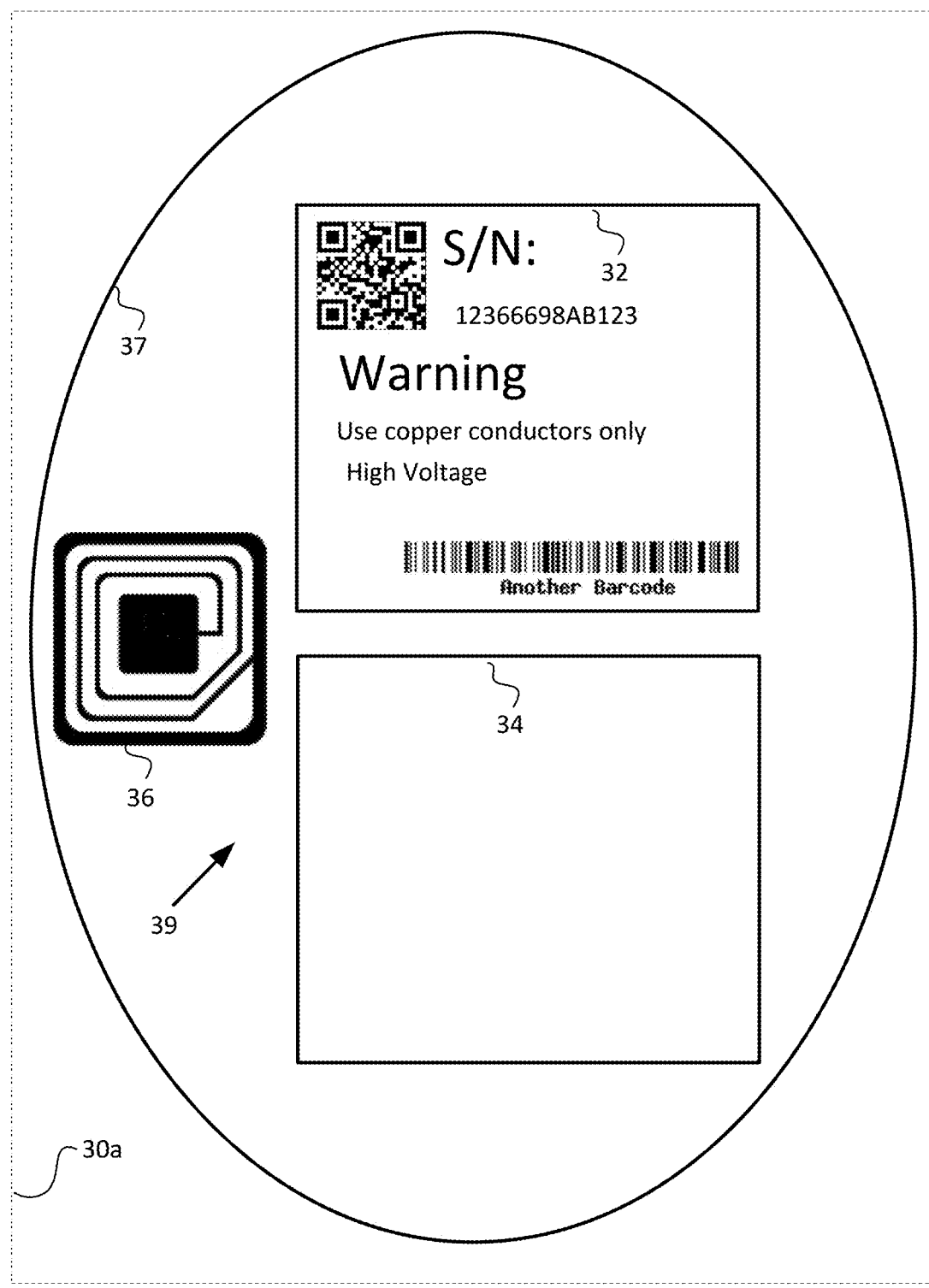

Reference is now made to FIG. 3B, which illustrates further features of portion 30a, according to illustrative aspects of the disclosure. The features of FIG. 3B may be combined with the features of FIG. 3 and/or 3A. Portion 30a may include a resealable aperture 37 of packing box 30 that, when opened from being sealed with a sealing tape with a non-transparent sealing tape, allows an operator to view details of one or more apparatuses 39 such as identification (ID) number (e.g., serial number), model number, brand name, etc., attached to apparatus 39 or elsewhere in packing box 30, which may be identified on, for example, serial number plate 32 and/or label area 34. While aperture 37 is shown in FIG. 3B as a particular shape and size, it may be of any shape and size. If the sealing tape is, for example, transparent, the combination of sealing tape and aperture 37 may form a window through which the above-mentioned information may be viewed from outside packing box 30 without opening or otherwise modifying any portion of packing box 30. For example, the window may allow an operator to view details of apparatus 39, such as ID number or model number/brand name attached to apparatus 39 as serial number plate 32 and/or label area 34 without removing the sealing tape placed over aperture 37. Where aperture 37 is unsealed, it may be resealed, such as with the same or different sealing tape, which may be transparent or non-transparent. The term "transparent," as used herein to describe the window, is intended to include a window that is partially transparent such that the desired information may still be viewed through the window.

The details attached to apparatus 39 or elsewhere in packing box 30 may be readable in any of a number of ways, for example in the form of alphanumerical and/or other characters that may be human-readable or readable via a machine using optical character recognition, read via a barcode, read via quick response (QR™) code, and/or in the form of one or more radio frequency identification (RFID) tags 36. Packing box 30 may vary in size and shape, for example, in order to best accommodate an item packed in packing box 30. According to aspects of the disclosure herein, aperture 37 may be initially covered with a sheet of sealing material (e.g. packing tape, as discussed above) attached to or part of packing box 30. The sealing material may be transparent and/or non-transparent, as discussed above. The sheet of sealing material may be removed to allow access to aperture 37, and may be re-attachable to packing box 30 to enable resealing over aperture 37 after inserting a configuration device inside packing box 30 via aperture 37. Thus, aperture 37 may be shaped and sized appropriate such that the configuration device may be fully inserted through aperture 37 into packing box 30.

Figure 3C:
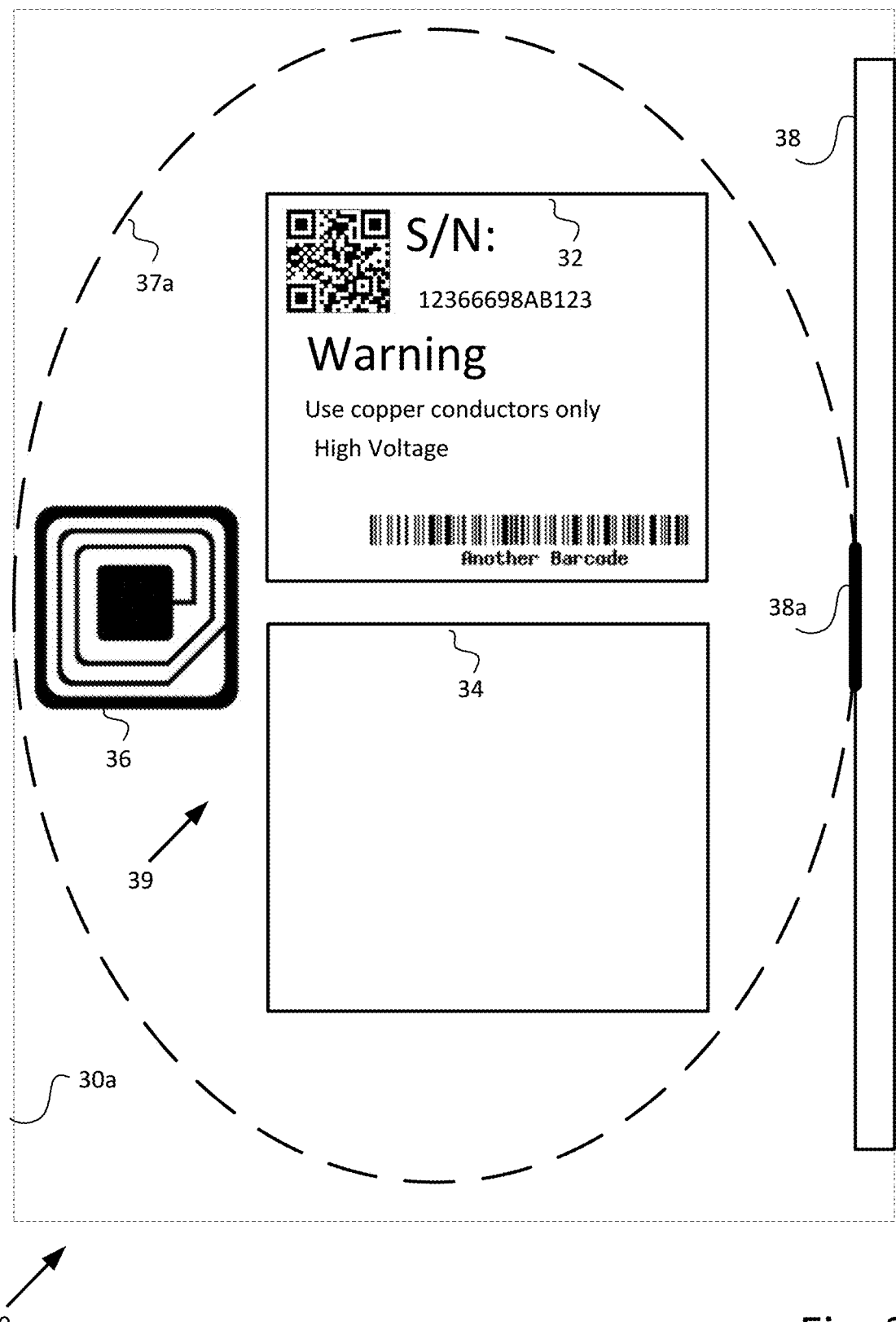

Reference is now made to FIG. 3C, which illustrates further features of portion 30a, according to illustrative aspects of the disclosure. Similar to FIG. 3B is an elliptical (or other shaped) aperture 37a shown by dotted line. An aperture portion may be formed by perforations through packing box 30 and by pulling out corresponding elliptical (or other corresponding shaped) resealable flap 38. The packing box 30 may be formed using any material(s), for example cardboard, corrugated fiberboard, plastic, and/or any other material appropriate to enable pulling out of resealable flap 38 along the perforations on the sides of the resealable flap 38. The pulling out of the resealable flap 38 may also form hinge 38a of resealable flap 38. Resealable flap 38 and subsequently formed aperture 37a and/or aperture 37 described in FIG. 3B may be substantially rectangular or may be circular, elliptical, triangular, square, rectangular, or in a different polygon shape, or in any other regular or irregular shape including non-polygon or non-geometric shapes. The features of FIG. 3C may be combined with the features of FIGS. 3, 3A, and/or 3B. For example, resealable flap 38 may also be used to embody the sheet of sealing material discussed above with regard to FIG. 3B, which in this case would be a sheet of re-sealable material.

According to features described above with respect to any of FIGS. 3, 3A, 3B, and 3C, one or more elements containing information (e.g., ID, model no., serial no., other descriptive information) about packing box 30, about any apparatus within packing box 30, and/or about configuring the apparatus, may be in any form such as one or more labels, RFID tags, pieces of paper with printed configuration details, and/or document wallets, and may be attachable to an inner or outer surface of packing box 30 and/or placeable inside packing box 30 via resealable flap 38 and/or apertures 37/37a. Such elements (e.g., labels, RFID tags 36, a piece of paper with configuration details, document wallets) may be attachable to apparatus 39 and/or packing box 30. A window may be formed in packing box 30 by use of, for example, one or more apertures 37 or 37a, and a sealed or re-sealable portion such as transparent adhesive tape adhesive may or may not cover the aperture(s) to allow the viewing and/or scanning of such element(s) (e.g., labels, RFID tags 36, a piece of paper with configuration details, document wallets) from outside packing box 30 through the aperture(s). In some cases, the aperture may be non-transparent, especially where reading any desired information inside packing box 30 (from outside packing box 30) can be performed non-optically, such as via RFID scanning. Alternatively or additionally, a window may be included in apparatus 39 to allow the viewing and or scanning of such elements (e.g., labels, RFID tags 36, a piece of paper with configuration details, document wallets) through the surface of packing box 30 and/or through apertures 37/37a and/or flap 38.

Figure 3D:
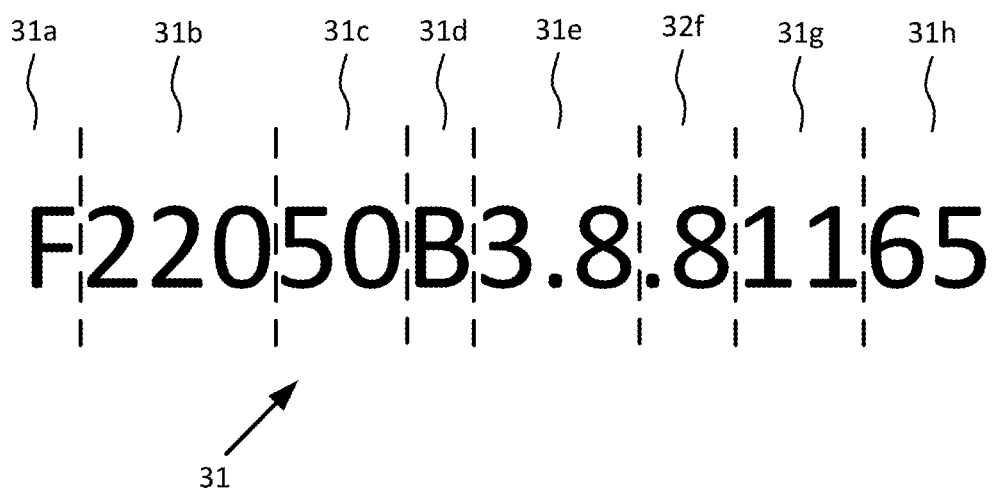
FIG. 3D illustrates further features of a serial number plate and/or label area, according to illustrative aspects of the disclosure.

Reference is now made to FIG. 3D, which illustrates further features of an ID (e.g., serial number) plate 32 and/or label area 34 of any of FIGS. 3-3C, according to illustrative aspects of the disclosure. ID plate 32 and/or label area 34 may be used as a configuration device and may include any information including or otherwise associated with configuration information, such as an alpha numerical string 31, bar code, QR code, etc. For purposes of explanation with regard to FIG. 3D, the information will be assumed to be the alphanumeric string 31 printed in human-readable form. However, it will be understood that the information may be embodied in any other format desired, which may or may not be human-readable and may be computer-readable or may be stored in electronic form such as in an RFID tag. Thus, all discussions herein with regard to alphanumeric string 31 may be equally applied to any other format of the information. The information in alphanumeric string 31 is, in this example, shown as the alphanumeric string F22050B3.8.81165, and in this example is organized into two or more logical portions, in which example logical portions 31a, 31b, 31c, 31d, 31e, 31f, 31g, and 31h demarked by dotted lines used to show the portions for the purpose of this description but may not necessarily be visible to a user or a scanner device and/or camera 212. An optical reading device, such as camera 212 (FIG. 2), may be used to read the alphanumeric string 31, and a computing device coupled to or including the optical reading device may be used to perform, such as via an algorithm of processor 200, optical character recognition (OCR) of the alphanumeric string 31. Using the example that apparatus 39 is an inverter, the algorithm may then further parse alphanumeric string 31 to derive that portion 31a which shows the character 'F', which in this example may indicate a particular language (such as French, for example). Portion 31b may indicate voltage and/or phase information, for example "220" may indicate a voltage of 220V for a single phase. Portion 31c may indicate frequency information, for example "50" may indicate 50 Hz. Portion 31d may indicate one or more other characteristics of the apparatus(es) 39, for example, "B" may indicate that the inverter is bi-directional in its conversion of power capability such that it may convert DC to AC and/or convert AC to DC, whereas "U" may indicate uni-directional conversion capability. Portion 31e may indicate operating power information, for example "3.8" may indicate an operating power of 3.8 kilo watts (KW). Portion 31f may indicate other power information, such as "0.8" indicating a power factor of 0.8. Portion 31g may indicate operating current information, such as "11" indicating an operating current of 11 amperes. Portion 31h may indicate an ingress protection (IP) rating of the housing of the inverter, for example "65" may indicate an IP rating of 65. Various other operating parameters of the inverter and/or other apparatuses 39 as described herein may be included in alphanumeric string 31. Alphanumeric string 31 may also include characters which are encoded and/or not readily recognizable, for example, portion 31a which shows the character 'F' may be represented by the symbol '%' which the algorithm parses portion 31a to derive that the language on display 181 is French for example. It will be understood that the various portions 31a-31h are merely examples, and there may be fewer or more portions, which may be in any order, and which may indicate any information associated with apparatus 39 and/or the configuration of apparatus 39 as desired. For example, where apparatus 39 is an apparatus other than an inverter, there may be other characteristics of apparatus 39 that may be desired to be imparted via one or more portions of alphanumeric string 31.

Multiple packing boxes 30 may be palletized in order to be stored or transported to an end user on a pallet or pallets. Packing boxes 30 may be positioned on a pallet in such a way as to allow an operator to view through aperture 37 and/or open resealable flaps 38/apertures 37a in order to view the inside of packing boxes 30 easily. The view of the inside of packing box 30 to the user may include RFID tag 36, serial number plate 32 and/or label area 34. Packing boxes 30 may also be positioned on a pallet in such a way as to allow an operator to see labels, alpha numerical number 31, document wallets, scan RFID tag 36 attached to a surface of packing boxes 30 as described in FIG. 3A above.

Figure 4A:
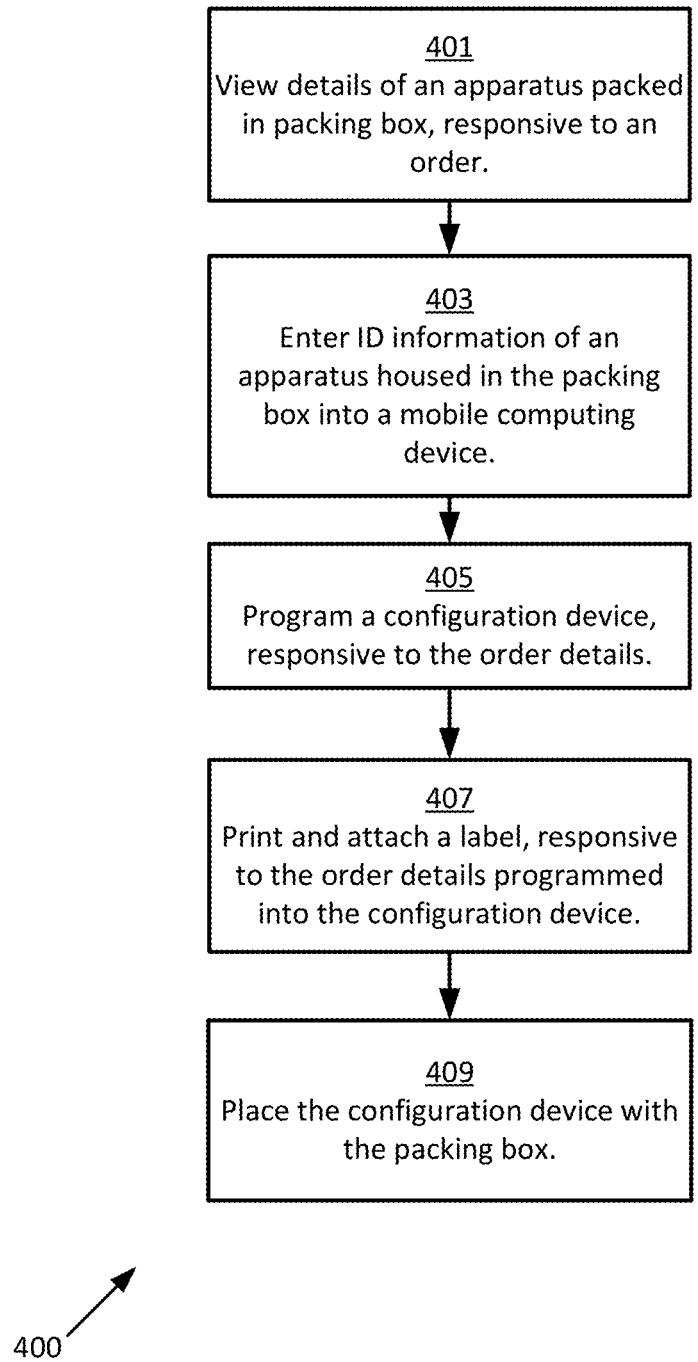
FIG. 4A shows a flowchart of a method, according to illustrative aspects of the disclosure.

Reference is now made to FIG. 4A, which shows a flowchart of an example method 400, according to illustrative aspects of the disclosure. By way of non-limiting example, the following description relates to ordering and configuring one or more apparatuses 39 for an interconnected photovoltaic system that may be, or may be similar to, power systems 10a or 10b described above, for example. However, it will be understood that the method of FIG. 4A may be performed for any other apparatuses as desired. The steps in FIG. 4A may be performed in the order shown or in another order, and any of the steps may be dropped, skipped, merged with other steps, or further subdivided into sub-steps as desired. Any of the steps may be performed by, e.g., a user, by a machine such as a computing device, and/or by a user with assistance from or via use of a machine such as a computing device. Step 401 may be initiated when a consumer wishes to order one or more apparatuses 39 for a system such as an interconnected photovoltaic system. The order for the apparatuses 39 may be associated with a specification for the interconnected photovoltaic system. The specification may indicate, or be used to determine, the number of apparatuses 39 and operating parameters of each of the apparatuses 39 utilized in the interconnected photovoltaic system. More specifically, the specification may typically include the number of power sources 101, system power devices 109, power devices 103, link units 107 and power circuits 135 based on the expected amount of power to be utilized from the interconnected photovoltaic system. For example, the number of each of the apparatuses 39 may be included in the specification, or may be determined using the specification. The specification may be used to determine, or may indicate, the input and output power handling requirements of each apparatus 39, bearing in mind the current and voltage levels of the interconnected photovoltaic system. The specification may also indicate whether the interconnected photovoltaic system will be subject to safety considerations, environmental conditions, load demands, temperature considerations and/or if storage devices such as storage devices 106 are to be utilized. A design for an installation or an upgrade to an installation may therefore indicate the number of strings $ST_n$, string length, types of inverters (used for system power devices 109) and number and type of power devices 103, the types of power sources 101 and types of storage devices 106 based on site size of the power system. The design may form the specification, or may be determined based on the specification.

For example (and this example will be used with regard to describing FIG. 4A), an order may have been made which includes an inverter to realize a particular system power device 109 as part of power systems 10a/10b, with the system design, utilizing the inverter, processing 2.8 kilowatts (kW) at peak-power operation. However, it will be understood that any other apparatuses and specifications may be used. In this particular example, it may be determined that an inverter best suited for the system is rated at 3 kW. Details of the order for the inverter may include: the model number and name, operating input DC voltage range, number of phases (single phase or 3 phase output), output AC voltage (minimal, nominal and maximum), maximum continuous AC output current, frequency of the output, output power factor, maximum ambient temperature and/or ingress protection (IP) rating of the housing of the inverter.

At step 401, where an order includes an inverter, an operator in a warehouse may locate an inverter corresponding to the order. The inverter may be packaged in packing box 30. The inverter may have a rating of 3 kilowatts, for example. At step 401, the operator may open the resealable flap 38 or apertures 37/37a of packing box 30. Pulling out of the resealable flap 38, if the flap portion is rectangular for example, may tear the perforations on the three sides of the resealable flap 38, and the remaining side of the resealable flap 38 or apertures 37/37a, which is not perforated may act as a hinge of the resealable flap 38. When the resealable flap 38 or apertures 37/37a is opened, in step 401, the serial number plate 32 of the inverter, and/or its serial number responsive to an order for an inverter, may be viewable to the operator. Alternatively, at step 401, the operator may view serial number plate 32 of the inverter through the opened aperture, view the details of serial number plate 32 as a label attached to the surface of packing box 30, or view details of a document via a see-through document wallet which may be attached to the surface of packing box 30.

The operator at step 403 may utilize computing device 20 running an application with a graphical user interface (GUI) to scan, using camera 212, alpha numerical number 31, the bar code or QR™ code of serial number plate 32 in order to enter the serial number of the inverter into the computing device 20. Alternatively or additionally, the operator may utilize a scanning device, such as a hand-held bar code/QR™ code scanner or an RFID scanner, to scan RFID tag 26. The hand-held scanner may be attached to mobile computer system 20. Alternatively, the operator may read the serial number visible on serial number plate 32 and manually enter the serial number using an input device, such as a keyboard for computing device 20.

At step 405, details of the order may be loaded into computing device 20 and/or downloaded from server 226, and configuration device 19b may be programmed responsive to the details of the order for the inverter. The programming in step 405 may, subsequent to delivery of the inverter, allow an installer of power systems 10a/10b to commission the inverter and to establish thereby, a unique set of operating parameters (e.g. input current and/or voltage, output current and/or voltage, duty cycle communication connectivity, etc.) for the inverter as ordered.

Establishment of a unique set of operating parameters may provide certain potential advantages. For example, a 3 kW-rated inverter installed in a power system where the inverter will process 3 kW of power may be configured to operate according to a first preferred input current level. The same 3 kW inverter installed in a power system where the inverter will process 2.8 kW of power may be configured to operate according to a second preferred input current level. As another example, an inverter may include a Wi-Fi™ communication chip. If installed in a system where a Wi-Fi™ communication system is not supported, the communication chip may be disabled (which may reduce power consumed by the inverter for auxiliary tasks, increasing system efficiency). As yet another example, optimal inverter operation (e.g. switching frequency used for switching the inverter switches) may be affected by ambient temperatures in the installation location. Configuration device 19b may program the inverter to decrease switching frequency (which may reduce inverter temperature and potential overheating) in response to a determination that the inverter will be installed in a hot environment. As yet another example, some inverters may be installed in power systems having multiple power devices providing MPPT functionality for each power source. An inverter may be programmed to provide MPPT functionality at each inverter input for systems where there are not power devices providing MPPT functionality for each power source. Configuration device 19b, programmed at step 405, may contain information for providing the inverter with an indication of whether or not the instant power system has MPPT-enabled power devices, and whether or not the inverter should apply MPPT at each inverter input.

As another example of operational advantages of establishment of a unique set of operating parameters during installation and/or commissioning, many utilities require that the Total Harmonic Distortion (THD) current of a power device or a system power device (e.g., a solar inverter) be below a certain threshold. For example, a local utility may require that the current THD be below 3% or 5%. Increasing switching frequency at the system power device may decrease THD (by providing a faster adjustment of input current), but may also incur additional losses. Configuration device 19b programmed at step 405 may contain information regarding local THD requirements and information regarding the size of the power installation (e.g. 7 kW, 100 kW, 1 MW, etc.), and a suitable frequency may be selected by the power device to adhere to the THD requirement (which may be calculated as a percentage, based on the size of the power installation) and to reduce losses which may be incurred by switching at a higher frequency than is necessary. For example, a first power system may provide 5 kW, at a voltage of $220V_{RMS}$ and a main current of 5000/220=22.73 $A_{RMS}$. If the allowable THD is 5%, the root-mean-square current value of current harmonics may be 1.14 $A_{RMS}$. A first inverter installed in the first power system may select a switching frequency of, for example, 16 kHz, to adhere to the allowable root mean square (RMS) voltage specification.

A second power system may provide 4.8 kW, at a voltage of $220V_{RMS}$ and a main current of 5000/220=21.8 $A_{RMS}$. If the allowable THD is 3%, the root-mean-square current value of current harmonics may be 0.65 $A_{RMS}$. A second inverter installed in the second power system may select a higher switching frequency of, for example, 32 kHz, to adhere to the allowable RMS.

The commissioning of the device may take place when the installer inserts configuration device 19b into configuration device reader 19a, which may be housed in housing 16 which houses system power device 109. In other words, at installation, configuration device 19b may be placed in, connected to, and/or be in communication with the inverter. Based on the information in configuration device 19b, the 3-kilowatt inverter may now perform as a 2.8-kilowatt inverter as ordered. For example, the installer may insert configuration device 19b into configuration device reader 19a, thereby causing the inverter to act as a 2.8-kilowatt inverter. The inverter might not function properly if not connected to configuration device 19b during or before commissioning, since step 405 may authenticate the ID (e.g., serial number or other identifier) of the inverter with configuration device 19b. Moreover, the authentication may be such that another configuration device 19b might not be used to, for example, change the inverter so as to operate at 3-kilowatts or at a different power level. Rather, the inverter will continue to operate as ordered and subsequently configured by an end user/installer by insertion of configuration device 19b into configuration device reader 19a. For example, the ID obtained (e.g., scanned) at step 403 may be hashed using a suitable hashing algorithm (e.g., SHA-2), with the resultant hash code saved to configuration device 19b. An inverter may be configured to respond only to configuration device 19b having a hash code corresponding to the inverter ID.

At step 405, the configuration may be determined based on whether a system power device 109 and/or link unit 107 may be enhanced by the feature of being able to convert power bidirectionally. With respect to link units 107, which may include a power device, a first direction of power conversion by the power device may be when multiple storage devices 106 may be sourced with converted power from the power devices similar to power devices 103. Storage devices 106 may receive converted power from the power devices when storage devices 106 may be being charged for example. A second direction of power conversion may be used when power from storage devices 106 is converted by the power device to be supplied to loads 104 via system power devices 109. The second direction of power conversion may also include power from power sources 101 with respective power device 103.

With respect to system power devices 109, which may be DC to AC inverters, a first direction of power conversion by the inverters may be from AC to DC. The first direction may be used when multiple storage devices 106 are sourced with converted power from load 104 which may be an AC utility grid, for example. Storage devices 106 may receive converted power from the AC utility grid via the inverters converting the AC to DC power when storage devices 106 may be being charged, for example. A second direction of power conversion may be used when power from storage devices 106 is converted by inverters to be supplied to loads 104 via system power devices 109. The second direction of power conversion may also include power from power sources 101 with respective power device 103.

A further consideration of step 405, with respect to system power devices 109 connected in parallel such as shown in FIGS. 1A and 1B, may be to provide a configuration for system power devices 109 to share the power conversion by system power devices 109 to load 104 according to a prescribed function, with each system power device 109 autonomously determining its share of power conversion. Each system power device 109 may then operate according to its own power conversion formula/function, such that overall the parallel connected system power devices 109 share the power conversion to load 104 in a predetermined manner. An example of such a configuration to share the power conversion by system power devices 109 to load 104 according to a prescribed function is shown by U.S. Pat. No. 8,289,742 to Adest, et al., entitled "Parallel Connected Inverters," hereby incorporated by reference for its teaching of a configuration for sharing a power conversion load according to a prescribed function.

A further consideration at step 405 may be with respect to the operating language for the display 181 of housing 16, which houses system power device 109 and/or power devices 103, link units 107 and power circuits 135. For example, if packing box 30 is to be delivered to Germany, the operating language displayed on display 181 may be programmed, at step 405, to be German. The labelling performed at step 407, described below, may then be produced in German as well. Thus, the content shown on display 181 and/or on the labelling (including, for example, which language is used) may depend on the intended destination of packing box 30 (which may be specified by the order). Additionally, at step 405, the configuration that is programmed may be specific to a location or standard. For example, if system power device 109 is an inverter delivered to Germany, a further aspect of step 405 may be to configure configuration device 19b so that the inverter, when configured by configuration device 19b, will operate according to German Low Voltage Grid Code VDE-AR-N-4105 (LVGC). German Low Voltage Grid Code VDE-AR-N-4105 (LVGC) includes requirements related to phase balancing, frequency-based power reduction, reactive power control, inverter reconnection conditions, total harmonic distortion, power factor and output power control. Other international standards for grid converters may include, for example, IEEE 929-2000: Recommended Practice for Utility Interface of Photovoltaic (PV) Systems, IEC 61727; "Characteristics of the utility interface for photovoltaic (PV) systems"; International Electrotechnical Commission, IEC 61727, 2002 and EN61000-3-2-A standard for current harmonics. Thus, the configuration device may be programmed in accordance with a desired operating requirement for the apparatus(es) 39 associated with the location in which the apparatus(es) 39 are to be operated and/or with the intended destination of packing box 30.

A further consideration of step 405 with respect to power devices 103 may be to provide or not provide, depending upon an order, certain features of power devices 103 such as bypass units Q9, safety devices 150, and/or provide support (physical device or configuration support) for the type of communication between apparatuses 39 such as power devices 103 and system power devices 109, for example. The type of communication may be power line communication (PLC), acoustic communications technology, or additional technologies such as ZIGBEE™, Wi-Fi, BLUETOOTH™, near field communication (NFC), cellular communication or other wireless methods. At step 405, the configuration may be programmed to designate a power device 103 as a primary controller, or the configuration may be programmed to cause a power device 103 to work with a central controller. Configuration device 19b, programmed at step 405, may further contain information for enabling one or more communication protocols according to a communication technology used. For example, if the power device 103 is being configured to use PLC, configuration device 19b may further contain information related to modulation frequencies, redundancy requirements, etc.

Programming configuration device 19b at step 405 may comprise, for example, printing a server number or other ID on a piece of paper, causing (e.g., instructing) the installer to input the server number or other ID to the apparatus 39 (e.g. inverter) upon power-on, wherein the apparatus 39 may be configured to connect to the server indicated by the address. The server may contain all the relevant configuration information disclosed herein, and the server may transmit the configuration information to the inverter upon first power-on. This implementation may provide additional cost savings, and a flexible reconfiguration possibility. For example, if after shipping the apparatus 39 a configuration setting should be changed—the server containing the relevant configuration information may be updated without physically accessing the apparatus 39, which may be in transit.

At step 407, some details of step 405 may be used to produce a label or other physical indicator which may be attachable to label area 34 or anywhere else in or on packing box 30. The label may be in the appropriate language of the country in which the system power device 109 and/or apparatus 39 is sent to and/or in accordance with a language specified or implied by the order. Where apparatus 39 is, for example, an inverter, such as system power device 109, the information may include, for example: the model number and name, the firmware version, operating input DC voltage range, number of phases (single phase or 3 phase output), output AC voltage (minimal, nominal and maximum), maximum continuous AC output current, frequency of the output, output power factor, maximum ambient temperature, and/or ingress protection (IP) rating of the inverter. According to some aspects, step 407 might not be featured, and no label may be attached to the apparatus 39 and/or packing box 30.

Once the label is attached (e.g., to label area 34), configuration device 19b may be placed inside a bag or other container, which may be attached with adhesive tape to serial number plate 32 and/or label area 34 inside packing box 30 and/or in a see-through document wallet which may be attached to the surface of packing box 30. Additionally, an installation manual and other printed materials appropriate to the step 405 in the language of the country in which the system power device 109 and/or apparatus 39 is being sent to may be inserted in the bag and/or in the see-through document wallet along with configuration device 19b at step 409. Once the bag is inserted and attached with adhesive tape to serial number plate 32 and/or label area 34 inside packing box 30, the resealable flap 38 or apertures 37/37a may be closed and resealed with adhesive tape.

Figure 4B:
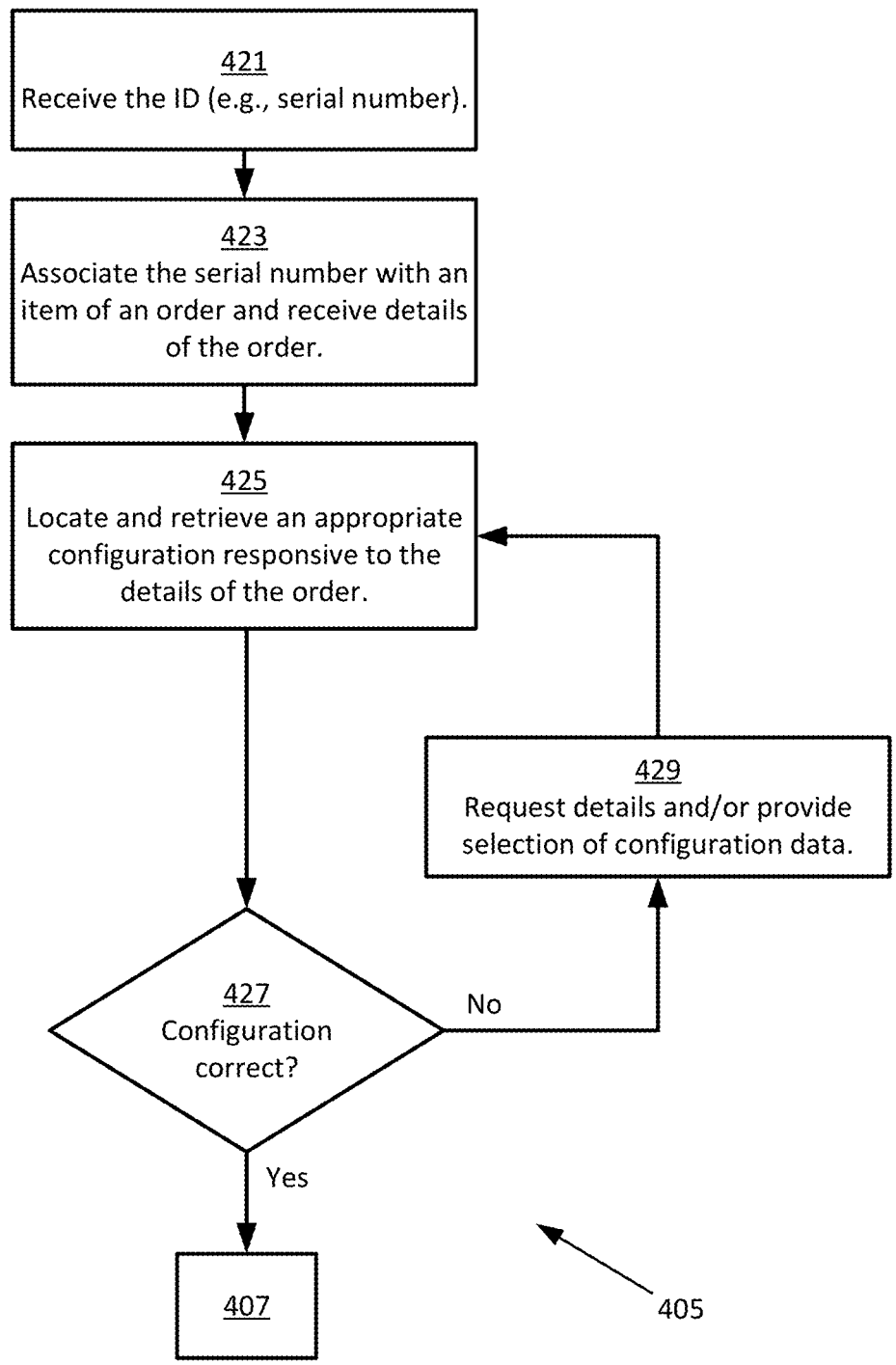
FIG. 4B shows more details of a programming step for the flow chart of FIG. 4A, according to illustrative aspects of the disclosure.

Reference is now made to FIG. 4B, which shows further example details of step 405, according to illustrative aspects of the disclosure. FIG. 4B may be performed in the order shown or in another order, and any of the steps may be dropped, skipped, merged with other steps, or further subdivided into sub-steps as desired. Any of the steps may be performed by, e.g., a user, by a machine such as a computing device, and/or by a user with assistance from or via use of a machine such as a computing device. At step 421, the serial number of apparatus 39 entered and/or scanned in step 403 may be received from storage 202, the receiver of cellular base station transceiver 220 and/or from server 226. Storage 202, cellular network 222 and/or server 226 are all places where the serial number may have previously been stored at step 403. At step 423, the serial number received at step 421 may be associated with a particular item/apparatus 39 of an order. The details of the order may be received at step 423.

The serial number received at step 421 and the association of the serial number to the particular item/apparatus 39 of the order may be operated on by an algorithm run by processor 200. The algorithm may alternatively operate on server 226 and/or cellular network 222. The algorithm at step 425 may locate and retrieve an appropriate configuration for the apparatus 39 which is responsive to the details of the order for the particular item/apparatus 39. Where apparatus 39 is an inverter, for example, the details used to locate and retrieve an appropriate configuration in step 425 may include reference to required operating parameters such as phase balancing, frequency of frequency-based power reduction, level of reactive power control, criteria for inverter reconnection conditions, total harmonic distortion, power factor, bidirectional power conversion and output power control for example. The correct operating system, a latest firmware update and the language of the operating system displayed on a display of apparatus 39 may also be included at step 425. Step 427 may typically include verification that the appropriate parameters, operating system firmware have been downloaded or read from storage 202, cellular network 222 and/or server 226 responsive to the details of the order and the running of the algorithm. At step 427, if the details retrieved in step 425 are incorrect or are incomplete, the algorithm may provide the possibility to request a user input. The user input may provide corrections to details retrieved in step 425 and/or provide additional configuration data to be included to the details in steps 429 and 425. If the configuration is correct at step 427, step 407 is implemented where some details of step 405 may be used to produce a label which may be attachable to label area 34.

Figure 4C:
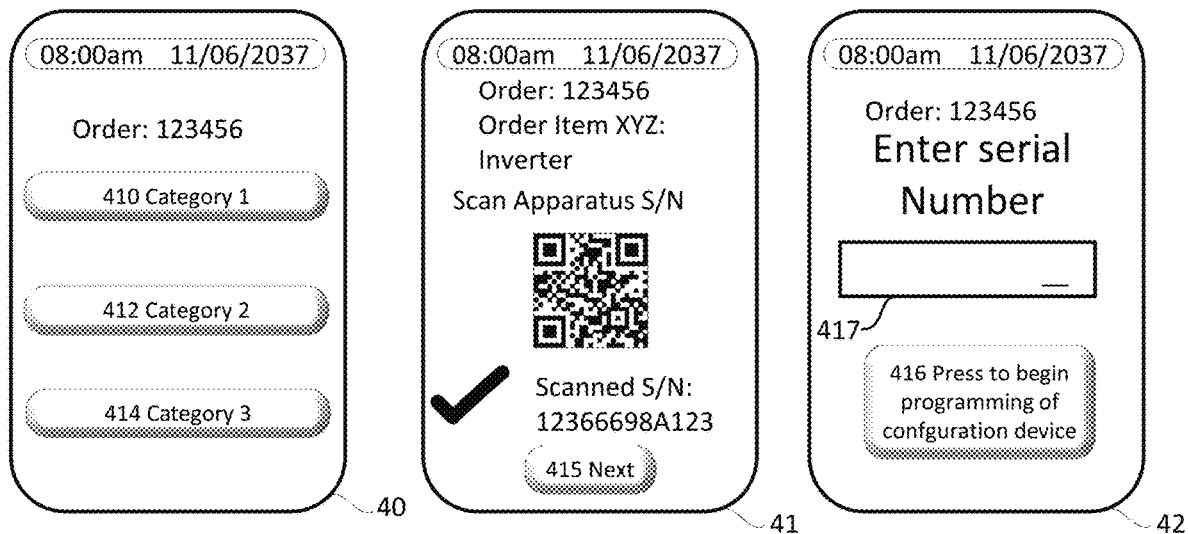
FIG. 4C shows various screen portions of a graphical user interface (GUI) provided on a display of a computing device (such as computing device 20), according to illustrative aspects of the disclosure.
Figure 4C:
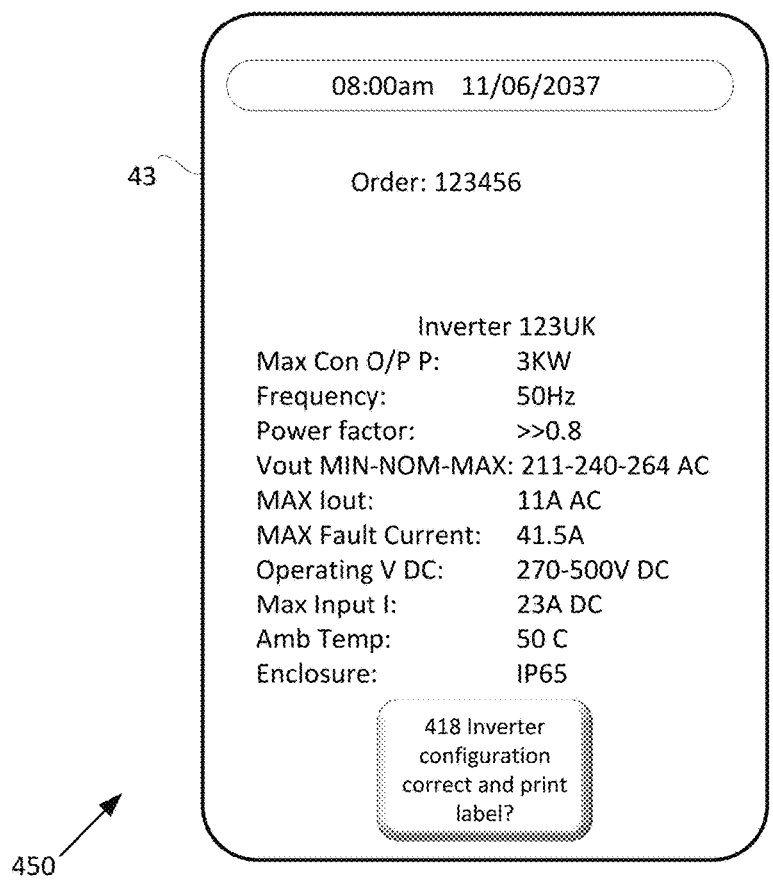

Reference is now made to FIG. 4C, which shows various screen portions of example graphical user interfaces (GUIs) 450, which may be displayed on display such as display 206 of computing device 20 during performance of the method of FIGS. 4A and 4B, according to one or more illustrative aspects of the disclosure. An operator in a warehouse may use the GUI 450, on computing device 20, after locating a generic inverter. The generic inverter may be an example of an apparatus 39 which may be packaged in packing box 30 as described above. Examples of the generic inverter may be system power devices 109. Other examples of generic components which may generally termed apparatuses 39 may include power devices 103, link units 107 and power circuits 135, which may be packaged in packing box 30.

The GUI 450 may be used to prepare apparatuses 39 as part of an order ready for dispatch. Screen areas 40, 41 and 42 of GUIs 450 may be included on one graphical screen, or be displayed on different graphical screens (e.g. depending on the screen size available). In the description that follows, a touch screen is referenced by way of example, but other types of screens and user input devices, such as computer monitors and a keyboard and/or computer mouse (with corresponding displayed pointer). In general, screen areas 40, 41 and 42 each may serve overall as an icon which, when selected (e.g., touched or swiped) by the user, allows one or more sub menu options to appear. The sub menu may, for example, allow the user to view other orders or to provide more order details for apparatuses 39, for example.

The following description considers an operator assembling and preparing for dispatch an order of apparatuses 39. The order, for example, may include a number of system power devices 109, power devices 103, link units 107 and power circuits 135 which may be packaged in packing boxes similar to packing box 30. As such, the operator assembling for dispatch of the order may arrange for multiple packing boxes 10 to be palletized on a pallet or pallets. The pallet or pallets may be utilized for storage and subsequent transportation of the order. Packing boxes 10 may be positioned on pallets in such a way as to allow an operator to open the resealable flap 38 and/or aperture of a packing box 30 easily. For example, the operator may be able to open resealable flap 38 and/or aperture of one or more packing boxes 10 without having to rearrange or move the packing boxes 10. As such, when apparatus 39 is housed in a packing box 30, the resealable flap 38 and/or aperture of packing box 30 may allow an opening of a resealable access of packing box 30, thereby revealing the ID shown on plate 32 of apparatus 39 (step 401). The ID may be encrypted and/or stored permanently in a memory of apparatus 39.

Screen area 40 shows to the operator an indication of an order (in this example, order number 123456) and buttons 410, 412, and 414, for example, which may, when selected, provide a list or other indication of details in each generic component category ordered for system power devices 109, power devices 103 and link units 107 respectively. The operator may then go down the list in each category. If the operator is viewing, for example, the list for the inverter category where there may be a number of inverters listed as part of the order, the operator may then place the right number of packaged inverters, in packing boxes 10, on a pallet. Then, for each inverter packaged in packing boxes 10 and listed on the list, the resealable flap 38 and/or aperture of an inverter packing box 30 may be opened (step 401) to scan using camera 212 the bar code or QR™ code of serial number plate 32 in order to enter the serial number of the generic inverter into computing device 20 (step 403) in storage 202 and/or server 226, cellular network 222.

Once scanned, a successful scan may be indicated to the operator by screen area 41 to show the successful association between order item XYZ and the scanned ID (in this example, Ser. No. 12/366,698A123) and/or alpha numerical number 31. Alternatively or additionally, the user may enter the serial number and/or alpha numerical number 31 in cursor area 417 via the keyboard function of mobile computing system 20 for example. Then, button 415, when selected, may reveal screen area 42 which prompts the operator to insert configuration device 19b (which may be an SD card) into an SD card reader/writer of mobile computing system 20 for example. Button 416, when selected, prepares for the programming of configuration device 19b which may be programmed responsive to the details of order item XYZ for the corresponding inverter, thereby providing a configuration for the inverter responsive to the details of the order.

Screen 43 is shown to the operator to confirm the details of the programming (e.g., at step 405) of configuration device 19b and pressing button 418 may confirm the configuration programmed onto configuration device 19b and may cause the printing of a label (e.g., at step 407). The label may be attachable to label area 34 of apparatus 39. The label may be in the appropriate language of the country to which the system power device 109 and/or apparatus 39 may be sent to. Where apparatus 39 is, for example, an inverter such as system power device 109, the information may include, for example: the model number and name, the firmware version, operating input DC voltage range, number of phases (single phase or 3 phase output), output AC voltage (minimal, nominal and maximum), maximum continuous AC output current, frequency of the output, output power factor, maximum ambient temperature, and/or ingress protection (IP) rating of the inverter. Manuals containing additional information (which may also be in the appropriate language of the country to which the system power device 109 and/or apparatus 39 may be sent to along with configuration device 19b may be attached to a surface of packing box 30 and/or placed in packing box 30 and the resealable flap 38 and/or aperture resealed with adhesive tape (at step 409). The operator may then proceed to place the next inverter on the pallet and may refer once again to the list of details in each generic component category ordered to provide a configuration device 19b, or a piece of paper with enterable configuration details for the inverter responsive to the details of the order.

Figure 5A:
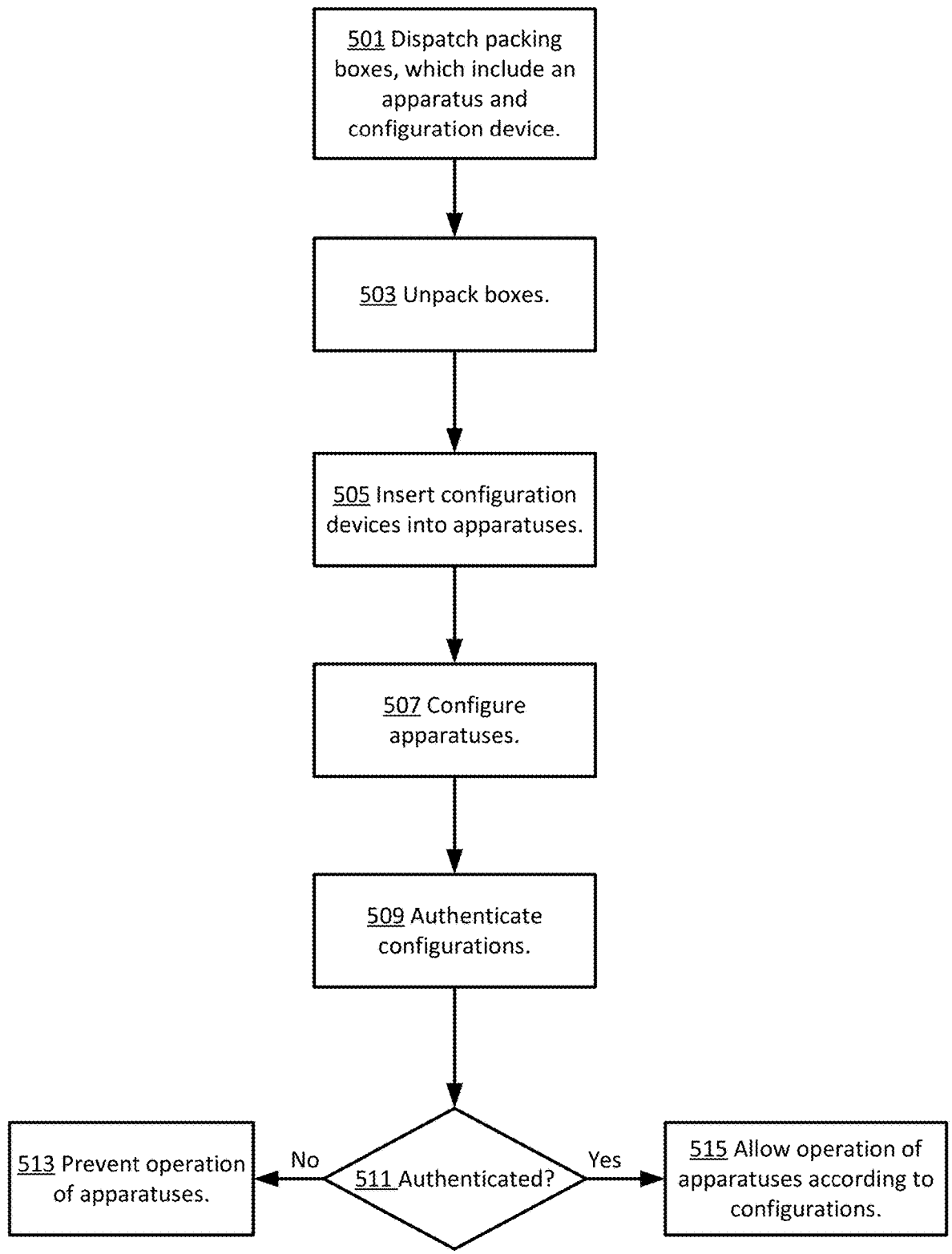
FIG. 5A shows a flowchart of a method, according to illustrative aspects of the disclosure.

Reference is now made to FIG. 5A, which shows a flowchart of an example method 500, according to illustrative aspects of the disclosure. FIG. 5A may be performed in the order shown or in another order, and any of the steps may be dropped, skipped, merged with other steps, or further subdivided into sub-steps as desired. Any of the steps may be performed by, e.g., a user, by a machine such as a computing device, and/or by a user with assistance from or via use of a machine such as a computing device. Further to steps 401-409, method 500 shows steps which may be carried out by an end user and/or installer upon receiving an order in packing boxes 10 from a supplier. At step 501, packing boxes 10 may be dispatched to a user such as the end user and/or installer, which may be part of an order a user such as the end user and/or installer has made. Packing boxes 10 may include apparatus 39, configuration device 19b and any accompanying documentation which may be in the language of the end user and/or installer. The end user and/or installer may unpack a packing box 30 at step 503, and may find configuration device 19*b* and any accompanying documentation at step 503 by opening the resealable flap 38 and/or aperture. The discussion that follows refers to system power device 109 but may also apply to include power devices 103, link units 107 and power circuits 135 which may be packaged in packing boxes like packing box 30 for example.

At step 505, according to instructions provided in the accompanying documentation, a user such as the end user and/or installer may remove housing 16 via fasteners 12 and insert configuration device 19*b* into configuration device reader 19*a* (e.g., when apparatus 39 may be system power device 109). Upon installation of system power device 109 and operating power being applied to system power device 109, system power device 109 may be configured (at step 507) and operated with the information and operating parameters previously stored on configuration device 19*b*. Details of the information and operating parameters previously stored on configuration device 19*b* by the supplier may be included on the label attached to apparatus 39 at label area 34 previously described in steps of method 400 above.

Step 509 may be an authentication step and may confirm that the ID (e.g., serial number) encrypted and/or stored permanently in a memory of apparatus 39 by the supplier is the same as or corresponds to the ID stored on configuration device 19*b*. Additionally, step 509 may ensures that if the user (e.g., end user or installer) has ordered a 3 Kilowatt system power device 109 the user does indeed receive the 3-Kilowatt-rated system power device 109. Step 509 may ensure that the user gets a 3-Kilowatt-rated system power device 109 as ordered, and that the system power device 109 will function according to the operating parameters corresponding to the label attached to the label in label area 34. At decision 511, if the ID stored (and possibly encrypted and/or hashed) semi-permanently or permanently in a memory of apparatus 39 by the supplier is the same as the ID stored on configuration device 19*b*, and/or it is verified the system power device 109 will function according to the operating parameters provided with configuration device 19*b*, normal operation of system power device 109 may continue in step 515. Otherwise, normal operation of system power device 109 may be prevented in step 513. For example, if the serial number of the system power device 109 does not correspond to the serial number, or encrypted serial number, stored in configuration device 19*b* inserted at step 505, the system power device 109 may be prevented from functioning and/or may display or indicate an error.

Figure 5B:
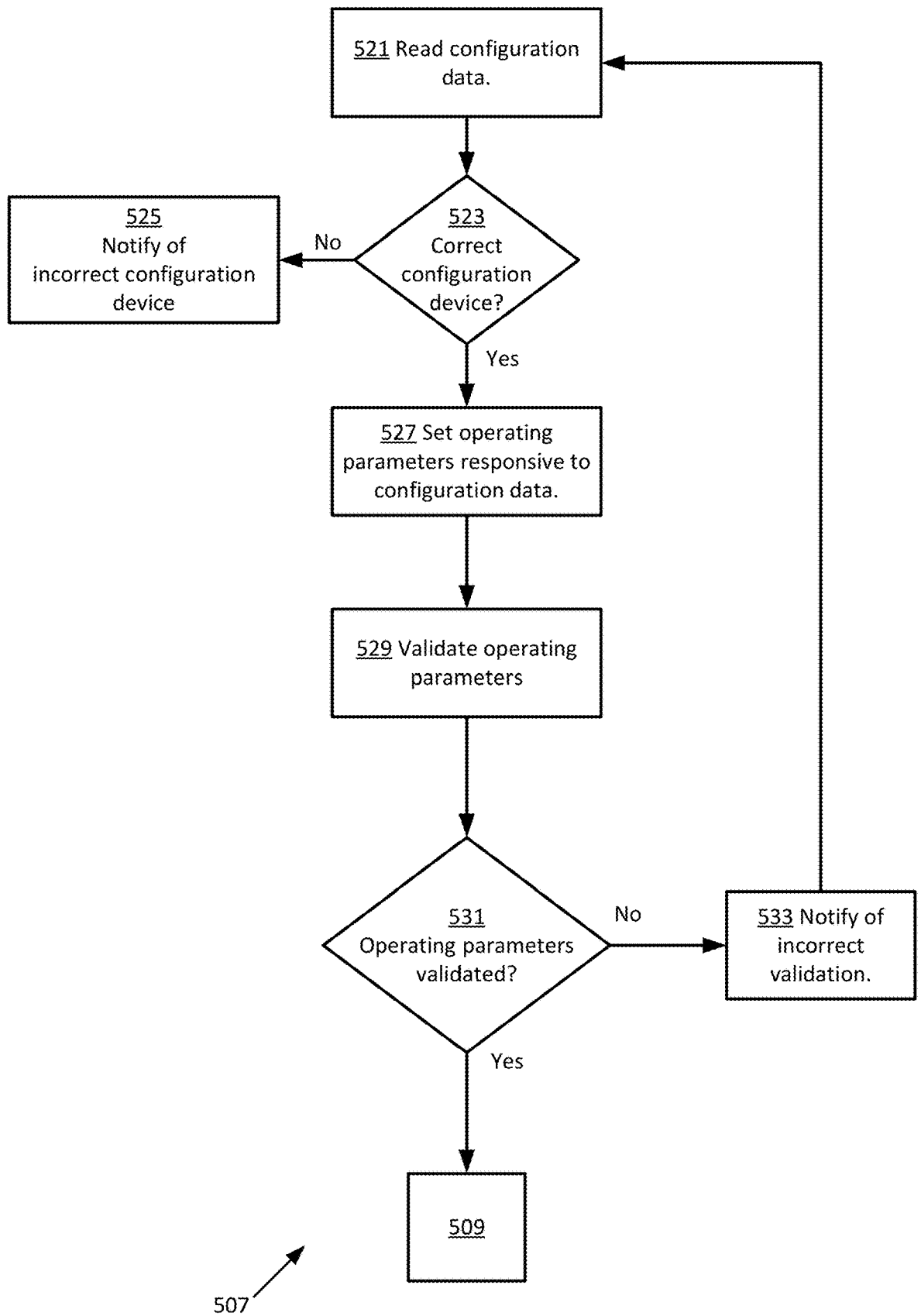
FIG. 5B shows more details of a configuring step for the flow chart of FIG. 5A, according to illustrative aspects of the disclosure.

FIG. 5B shows more example details of step 507 for the flow chart of FIG. 5A, according to illustrative aspects of the disclosure. FIG. 5B may be performed in the order shown or in another order, and any of the steps may be dropped, skipped, merged with other steps, or further subdivided into sub-steps as desired. Any of the steps may be performed by, e.g., a user, by a machine such as a computing device, and/or by a user with assistance from or via use of a machine such as a computing device. In step 521, using the example of an inverter for apparatus 39, it may be assumed that a user has previously inserted configuration device 19*b* into configuration device reader 19*a* prior to installation and application of operating power to the inverter. At step 521, a processor of the inverter reads the configuration data provided on configuration device 19*b*. The reading of the configuration data may establish a firmware update of the processor and an associated hardware of the inverter so that an operating language displayed on a display of the inverter may confirm to a user, that a firmware upgrade is taking place or not and that the configuration device 19*b* inserted into configuration device reader 19*a* is indeed the correct configuration device 19*b*. The firmware update may be initiated via a communication interface of the inverter which may connect directly to a local server, a dedicated local server or to server of a computing device (which may be, e.g., a mobile computing device) of the user in the vicinity of the server when power is supplied to the inverter.

According to aspects of the disclosure, configuration device 19*b* may include information to enable the inverter to connect to a server. The server and/or its connection to the inverter may be provided by virtue of a mobile computing device of a user being in the vicinity of the inverter and/or the server is in the vicinity of the inverter. For example, configuration device 19*b* may include the address of the server, and/or authentication information for providing the server. This feature may be useful, for example, where a monitoring station may include multiple servers and it may be desirable to provide an inverter with server identifying information for connecting to the correct server before powering on the inverter. Upon powering on the inverter for the first time, the inverter (e.g., a control and communication device in the inverter) may read the server identifying information (e.g. by reading configuration device 19*b*, or by an installer reading a configuration manual or piece or paper and manually inputting the server identifying information to the inverter). The inverter may have a preprogrammed serial number to be transmitted to the server, and the server may authenticate the inverter using the serial number.

To confirm that the correct configuration device 19*b* has been inserted, the ID stored on configuration device 19*b* may be compared with an ID previously stored and/or encrypted in a memory which may be included in the associated hardware of the inverter at step 523. If configuration device 19*b* is incorrect for the inverter, the user may be notified at step 525 on the display and further operation of the inverter may be prevented. Contact information, such as a telephone number and/or a website address such as a uniform resource locator (URL), may be provided at step 525 to help a user obtain a valid configuration for the inverter as ordered.

Upon a successful comparison of configuration device 19*b* with the ID previously stored (e.g., in a memory in the associated hardware of the inverter), the operating parameters for the inverter may be set at step 527 responsive to the configuration read at step 521. The operating parameters may include, for example, input current and/or voltage, output current and/or voltage, duty cycle, communication connectivity, power factor, frequency of the output, switching frequency, and/or total harmonic distortion of the inverter. At step 529, the operating parameters for the inverter set at step 527 may be validated to be correct and if so at step 531, authentication step 509 as described above may be performed. Otherwise at step 531 if the operating parameters for the inverter set at step 527 are not correct, a user may be notified at step 533 on the display and another attempt may be made to read the configuration data again at step 521. In the event that other attempts to read the configuration data again at step 521 fail, step 525 may additionally include further information via contact information, e.g., a telephone number and/or URL, presented on the display to help a user obtain a valid configuration for the inverter as ordered.

One or more illustrative aspects of the disclosure herein may include a configured general-purpose or special-purpose computing device including various computer hardware components, which are discussed in greater detail below. Various embodiments herein may also include non-transitory computer-readable media for storing computer-executable instructions that are readable by one or more computing devices and executable by one or more processors of the one or more computing devices, and/or may further store data and data structures as described herein. Such computer-readable media may be any type of media, which may be accessible by the configured general-purpose or special-purpose computing device. Such computer-readable media can include any physical storage media, such as memory, a disc, or other types of storage media, and may include, for example, RAM, ROM, EPROM, flash disk, CD-ROM, and/or other optical disk storage, magnetic disk storage or other magnetic storage devices, and/or any other media which can be used to carry or store desired program code mechanisms in the form of computer-executable instructions, computer-readable instructions, or data structures and which may be accessed by a general-purpose or special-purpose computing device. The computer-executable instructions may be stored on the computer-readable media in the form of software and/or firmware. Any of the steps and features described in connection with the FIGS. 4A, 4B, 4C, 5A, and 5B may be defined partially or fully by such computer-executable instructions, and may be performed as a result of one or more computing devices executing the computer-executable instructions.

In this description and in the following claims, a "computing device" may be defined as one or more software or firmware modules, one or more hardware modules, or combinations thereof, which work together to perform operations on electronic data in accordance with the computer-executable instructions that are used to configure the computing device. For example, a computing device may include the hardware components of a personal computer, as well as software or firmware modules, such as the operating system of the personal computer. Thus, a computing device may include a personal computer, laptop computer, desktop computer, handheld computer, smart phone, optical scanning computer, server, and/or any other one or more computers that have one or more processors for executing the computer-executable instructions. An example of a computing device is mobile computing device 20 (FIG. 2), which has one or more processors 200 that can execute computer-executable instructions stored on a computer-readable medium such as storage 202. The physical layout of the modules of a computing devices are not limiting. A computing device may include one or more different physical computers interconnected via a communication network. Likewise, a computing device may include only a single physical device (such as a single smart-phone or a single laptop) where internal modules (such as a memory and processor) work together to perform operations on electronic data. A mobile computing device may include for example, one or more laptop computers, net-book computers, cellular telephones, smart-phones, wireless telephones, personal digital assistants, portable computers with touch sensitive screens, and/or the like.

A network such as network 224 may include, for example, any architecture where two or more computer systems may exchange data. This may include, for example, a wide area network, Internet local area network, Intranet, wireless networks such as "Wi-Fi", virtual private networks, mobile access network using access point name (APN) and/or the Internet. Exchanged data may be in the form of electrical signals that are meaningful to the two or more computer systems.

It may be noted that various connections are set forth between elements herein. These connections are described in general and, unless specified otherwise, may be direct or indirect; this specification may be not intended to be limiting in this respect. Further, elements of one embodiment may be combined with elements from other embodiments in appropriate combinations or sub-combinations. For example, a piece of paper and/or configuration device 19b may both be inserted through a window of a packing box, or placed in a sealing envelope. Step 507 of FIG. 5B may be applied to a system using a USB stick and/or an SD card as configuration device 19b, or may applied to a system where a configuration code is printed on a sticker, the sticker is stuck to a packing box, and the configuration code is input to an apparatus in the packing box before or during power-on.

Alternatively, or additionally, according to embodiments described above, use of method 400, GUI 450, and method 500 may for example provide an order responsive to a predetermined specification for interconnected photovoltaic systems as described above. The specification may determine the number, types and operating parameters of each of the apparatuses 39 utilized in the interconnected photovoltaic system. Apparatuses 39 may be supplied with a con-figuration device which, when connected to an apparatus 39, configures the apparatus 39 with operating parameters such as voltages, currents, powers, temperature and frequencies, for example. A potential benefit to a manufacturer of apparatuses 39, which may be that generic apparatuses 39, allow the apparatuses 39 to be configurable to operate under various configurations, thus potentially allowing reduced product diversity at the point of manufacture but still being able to provide effective performance by apparatus 39 under a wide variety of operational parameters and conditions. The number of apparatuses 39 manufactured being limited may give the additional benefit of minimum stock inventory of apparatuses 39 stored in packing boxes 10. Product diversity in terms of operating parameter and ratings of apparatuses 39 may be restored at the point when the apparatuses are ordered, prepared and dispatched responsive to a specification of the end user of apparatuses 39 by program and supply of configuration device 19b. Such a way of ordering, preparing and dispatching apparatuses 39 may allow for the latest firmware updates for apparatuses 39 to be provided with the dispatch of an order as well as appropriate documentation and options of which features a customer may require which may be responsive to the budget of the customer.

Preparing and dispatching of apparatuses 39 in packing boxes 10 may be made via a resealable flap 38 and/or aperture, a label attachable to a surface of the packing box 30, RFID 26 and/or a see-through wallet which may be attached to the surface which allows a serial number of apparatus 39 to be connected to the order of user, to provide a configuration device which may be programmed and a label, both of which may be attached to apparatus 39. The resealable flap 38 and/or aperture may be resealed and packing box 30 may be dispatched to an end user. Configuration device 19b may be an SD card, optical disc, magnetic disk or disk on key. Configuration device 19b may be a uniform resource locator (URL) provided by a bar code printed on the label attached to label area 34. The bar code may be scanned by a smart phone of the end user/installer which may allow a download of an encrypted configuration for apparatus 39. The encrypted configuration for apparatus 39 may then be transferred to and stored in the apparatus by virtue of a wireless connection between a communication interface of the apparatus 39 and the smart phone of the user or connection to a local server.

All features and modifications of the described embodiments and dependent claims are usable in all aspects taught herein as desired. Furthermore, the features and modifications of the described embodiments are combinable and interchangeable with one another as desired.

The invention claimed is:

1. A system comprising:
 a power converter configured to convert an input power to an output power, the power converter comprising:
  a configuration device reader, and
  memory storing a first identifier, wherein the first identifier is encrypted; and
 a configuration device configured to store:
  a plurality of operating parameters related to the power converter, wherein the plurality of operating parameters are based on a plurality of order details for the power converter, and wherein at least one operating parameter of the plurality of operating parameters is related to conversion of power by the power converter, and
  a second identifier,
 wherein the configuration device is configured to provide, via the configuration device reader, the power converter with:
  the second identifier, to authenticate programming of the configuration device based on the first identifier and the second identifier, and
  the plurality of operating parameters to set a configuration of operation of the power converter based on the plurality of operating parameters.

2. The system of claim 1, further comprising: a packing box configured to house the configuration device and the power converter during transport of the power converter.

3. The system of claim 2, wherein the packing box comprises:
 an identifier associated with the power converter; and
 a resealable access configured to selectively obscure the identifier.

4. The system of claim 1, further comprising: a label indicating the plurality of operating parameters.

5. The system of claim 4, wherein the label comprises one or more words, and a language of the one or more words is based on at least one detail of the plurality of order details.

6. The system of claim 1, wherein the plurality of operating parameters indicate two or more of the following: an operating power, an operating voltage, an operating current, a total harmonic distortion, an operating language for display by the power converter, an operating power factor, or a number of phases of the operating voltage.

7. The system of claim 1, wherein at least one operating parameter of the plurality of operating parameters is also based on a grid code of a utility grid.

8. The system of claim 1, wherein the power converter comprises one or more of the following: a direct current (DC) to DC converter, a DC to alternating current (AC) inverter, or an AC to DC converter.

9. The system of claim 1, wherein the second identifier is encrypted.

10. The system of claim 9, wherein the first identifier corresponds to the second identifier.

11. The system of claim 1, wherein the configuration device comprises one or more of the following: a non-volatile memory card, an optical disc, a magnetic disk, or a disk on key.

12. The system of claim 1, wherein the power converter is configured to perform validation of the plurality of operating parameters.

13. The system of claim 1, wherein the power converter comprises a display configured to display one or more words of a language, and the language is based on at least one detail of the plurality of order details.

14. The system of claim 1, wherein the power converter is operable under a plurality of configurations of operation, and a specific configuration of operation of the power converter is dependent on a setting of the power converter based on the plurality of operating parameters.

15. A method comprising:
 manufacturing a power converter that is configured to convert an input power to an output power and that is operable under a plurality of configurations of operation, a specific configuration of operation of the power converter being dependent on a setting of a plurality of operating parameters of the power converter, the power converter comprising a configuration device reader;
 storing a first identifier in memory of the power converter, wherein the first identifier is encrypted;
 storing a second identifier on a configuration device, wherein the configuration device is associated with the power converter; and
 storing the plurality of operating parameters in a storage medium of the configuration device, wherein the plurality of operating parameters are based on a plurality of order details for the power converter, wherein at least one operating parameter of the plurality of operating parameters is related to conversion of power by the power converter, and wherein the power converter is configured to authenticate programming of the configuration device based on the first identifier and the second identifier and to set the configuration of operation of the power converter when the configuration device is coupled to the configuration device reader.

16. The method of claim 15, further comprising:
 providing, using the configuration device, the plurality of operating parameters to the power converter; and
 setting the configuration of operation of the power converter based on the plurality of operating parameters.

17. The method of claim 15, further comprising: operating the power converter according to the plurality of operating parameters.

18. The method of claim 15, wherein the plurality of operating parameters indicate two or more of the following: an operating power, an operating voltage, an operating current, a total harmonic distortion, an operating language for display by the power converter, an operating power factor, or a number of phases of the operating voltage.

19. The method of claim 15, further comprising: generating a label indicating the plurality of operating parameters, wherein a language of one or more words written on the label is based on at least one detail of the plurality of order details.

20. The method of claim 15, further comprising: packing the configuration device with the power converter for transport of the power converter.

21. A configuration device comprising:
 one or more processors; and
 memory storing instructions that, when executed by the one or more processors, cause the configuration device to:
  obtain a plurality of operating parameters related to a power converter that is configured to convert an input power to an output power and has a configuration device reader, wherein the plurality of operating parameters are based on a plurality of order details for the power converter, and wherein at least one operating parameter of the plurality of operating parameters is related to conversion of power by the power converter;

store an encrypted identifier related to the power converter; and provide the power converter with:
  the encrypted identifier to authenticate programming of the configuration device, and
  the plurality of operating parameters to set a configuration of operation of the power converter based on the plurality of operating parameters.

* * * * *